US007155467B1

(12) United States Patent
Rohrs

(10) Patent No.: US 7,155,467 B1
(45) Date of Patent: Dec. 26, 2006

(54) ADAPTIVE TYPE-PARTITIONED GARBAGE COLLECTION

(75) Inventor: Christopher Henry Rohrs, South Deerfield, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 669 days.

(21) Appl. No.: 09/605,271

(22) Filed: Jun. 28, 2000

Related U.S. Application Data

(60) Provisional application No. 60/195,392, filed on Apr. 7, 2000.

(51) Int. Cl.
G06F 17/30 (2006.01)

(52) U.S. Cl. ............................. 707/206; 707/200

(58) Field of Classification Search ........... 395/650; 707/200–205, 206; 717/152, 174; 711/114, 711/154; 714/6
See application file for complete search history.

(56) References Cited

U.S. PATENT DOCUMENTS

| | | | | |
|---|---|---|---|---|
| 5,485,613 | A * | 1/1996 | Engelstad et al. | 707/206 |
| 5,537,588 | A * | 7/1996 | Engelmann et al. | 707/202 |
| 5,930,807 | A * | 7/1999 | Ebrahim et al. | 707/206 |
| 6,047,295 | A * | 4/2000 | Endicott et al. | 707/206 |
| 6,151,685 | A * | 11/2000 | Li et al. | 714/6 |
| 6,253,215 | B1 * | 6/2001 | Agesen et al. | 707/206 |
| 6,272,674 | B1 * | 8/2001 | Holiday, Jr. | 717/174 |
| 6,336,164 | B1 * | 1/2002 | Gerdt et al. | 711/113 |
| 6,470,361 | B1 * | 10/2002 | Alpern et al. | 707/206 |
| 2001/0000821 | A1 * | 5/2001 | Kolodner et al. | 711/170 |
| 2002/0161792 | A1 * | 10/2002 | Garthwaite | 707/206 |
| 2002/0166116 | A1 * | 11/2002 | Eidt | 717/152 |

OTHER PUBLICATIONS

Dieckmann, S., and Hölze, U., "A Study of the Allocation Behavior of the SPECjvm98 Java Benchmarks," In Proceedings of the European Conference on Object-Oriented Programming, Jun. 1999.
Liberman, H. and Hewitt, C., "A Real-Time Garbage Collector Based on the Lifetimes of Objects," *Communications of the ACM*, 26(6):419-429 (1983).
Ungar, D., "Generation Scavenging: A non-disruptive High Performance Storage Reclamation Algorithm," ACM SIG Plan Notices, 19(5):157-167, Apr. 1984.
Bartlett, J.F., "Compacting Garbage Collection with Ambiguous Roots," Technical Report Digital Equipment Corporation, Western Research Laboratory, Palo Alto, CA, pp. 1-35 (1988).
Bartlett, J.F., "Mostly-Copying Garbage Collection Picks Up Generations and C++," Technical Report Digital Equipment Corporation, Western Research Laboratory, Palo Alto, CA, pp. 1-9 (1989).

* cited by examiner

*Primary Examiner*—Frantz Coby
*Assistant Examiner*—Neveen Abel-Jalil

(57) ABSTRACT

A collector for collecting non-referenced objects stored in a heap by a program while the program is executing in a computer system is presented. A sample and partition routine in the collector partitions the heap into cold space and hot space. The sample and partition routine defines hot space objects and cold space objects. After the heap has been partitioned, an object allocation routine in the collector stores hot space objects in hot space and cold space objects in cold space. A collection routine in the collector searches hot space for referenced objects and reclaims non-referenced objects stored in hot space. Upon determining that hot space is full, the collection routine searches cold space and hot space for referenced objects and moves referenced objects stored in hot space to cold space.

26 Claims, 17 Drawing Sheets

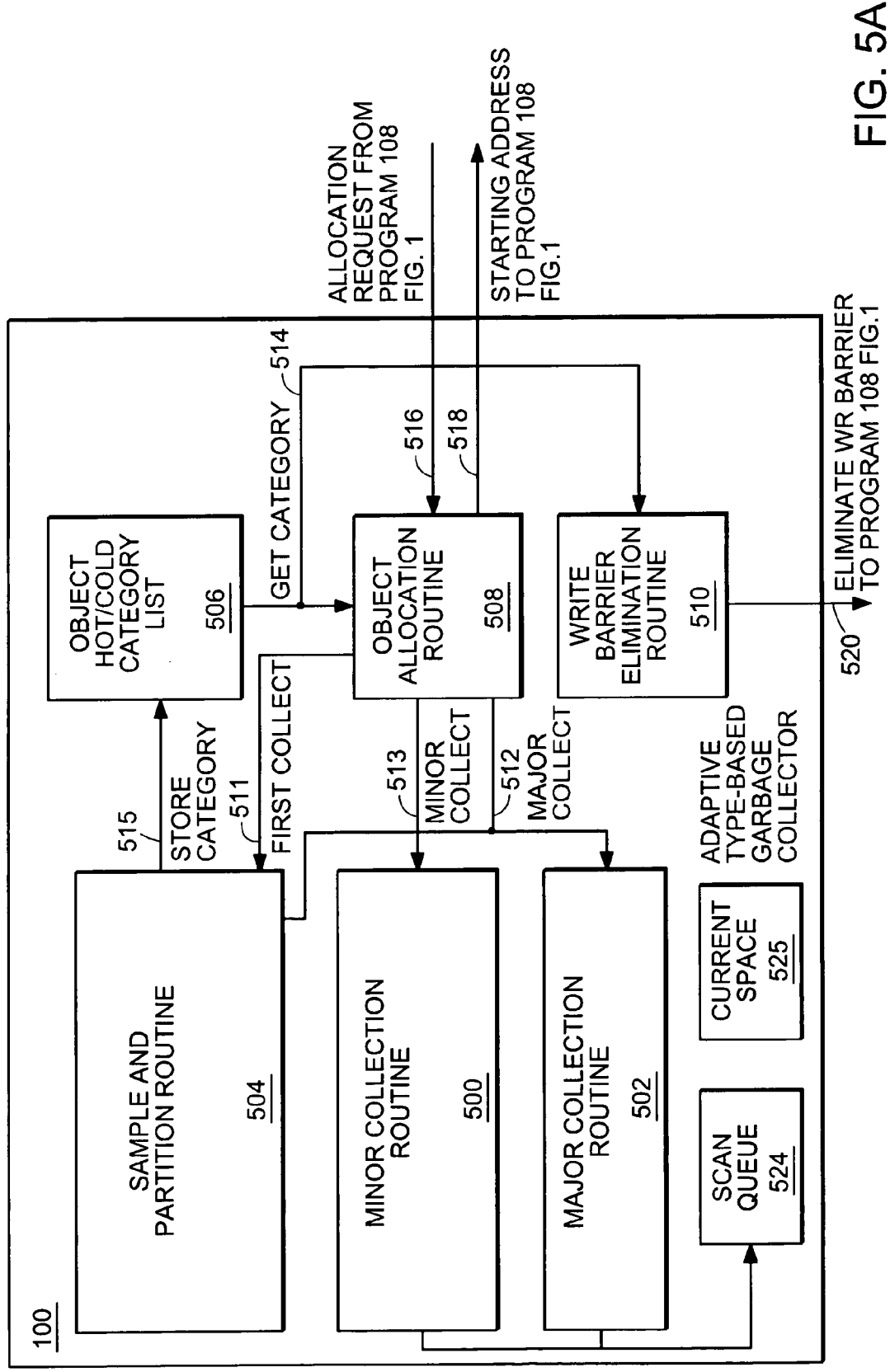

ADAPTIVE TYPE-PARTITIONED GARBAGE COLLECTION

RELATED APPLICATION

This application claims the benefit of U.S. Provisional Application entitled "Adaptive Type-Partitioned Garbage Collection" filed Apr. 7, 2000, Ser. No. 60/195,392, the entire teachings of which are incorporated herein by reference.

BACKGROUND OF THE INVENTION

A block of memory may be allocated for use by a program executing in a computer system. The block of memory is typically referred to as a heap. The heap may be further divided into fixed size pages. The program requests a portion of memory from the heap when needed, for example, to store an object such as an array.

A garbage collector, also referred to as automatic storage reclamation, manages the heap by reclaiming memory no longer required by the program. Typically, the garbage collector is executed if a currently executing program is unable to allocate memory for new objects because all the allocatable memory has been allocated to other objects. Garbage collection is required by computer programming languages such as LISP™, Java™, SmallTalk™ and ML™. Garbage collection can also be used by programing languages such as C and C++.

In order to determine which objects may be collected, the garbage collector traverses all pointers to objects reachable from the processor's call stack and registers. Objects reachable from the processor's call stack are considered non-collectable because there are currently being used. All the objects in the heap that are not reachable from the processor's call stack are collectable because they are no longer in-use and are thus garbage. The collectable objects are collected for future allocations.

Techniques for garbage collection include reference counting, mark-sweep collection and copying collection. The reference counting technique stores a reference count for each object stored in the heap equal to the number of pointers pointing to the object. The reference count is stored in a header field in the object. Objects may be reclaimed if the reference count is zero. However, the reference counting technique decreases the performance of the program because the cost of reference counting is proportional to the number of pointer stores. Also, cycles of garbage cannot be reclaimed by the garbage collector.

The mark-sweep collection technique marks all reachable objects. Reachable objects may be marked by setting a bit in the header field of each reachable object. After reachable objects are marked, the unmarked objects are stored in memory in a doubly-linked free list. Subsequently, memory is allocated by removing objects from the free list.

The copying collection technique divides the heap into two contiguous regions; a first region and a second region. Memory is allocated for an object from a first region. When all the memory in the first region is in use by the program, reachable objects are copied from the first region to a second region. The roles of the first region and the second region are reversed. This effectively provides available memory, for allocation purposes, from the end of the new first region formerly called the second region. However, the time taken to copy large objects from a first region to a second region can consume a large portion of the total program execution time.

Garbage collection can consume a portion of the total program execution time. In some object oriented programming languages, such as Java™, the garbage collector may occasionally consume as much as fifty percent of program execution time because collection is required to reclaim memory from the heap for the executing program.

Techniques are available for reducing the amount of program execution time consumed by the garbage collector for copying objects. One such method is age-based generational collection. An age-based garbage collector segregates objects into old and young objects dependant on the time at which memory was allocated for the object. The assumption is that memory allocated for young objects can usually be freed before memory allocated for old (longer lived) objects. Thus, the age-based generational collector collects the youngest objects; that is, those more recently having memory allocated to them. By doing so, long-lived-objects are not copied. By collecting only the youngest objects, the program execution time consumed by garbage collection is reduced.

However, age-based generational collection is not always appropriate for computer languages such as Java™. Java™ frequently updates long-lived objects, for example, by adding data to elements of an array. This updating may result in excessive copying which consumes program execution time.

Thus, various disadvantages exist in currently existing garbage collection techniques/methods and there is a need for improvement in garbage collecting.

SUMMARY OF THE INVENTION

The present invention provides a collector for collecting non-referenced objects stored in a heap by a program while the program is executing in a computer system. An object allocation routine stores an object of a particular type in one of a plurality of spaces in heap dependent on a predefined category for the type. A collection routine searches one of the spaces for referenced objects and reclaims non-referenced objects stored in the searched space. A sample and partition routine defines a category of an object stored in the heap to be hot or cold.

Upon determining that hot space is full, the collection routine searches cold space and hot space for referenced objects and moves referenced objects of the hot category stored in hot space to cold space. The sample and partition routine also includes a write barrier elimination routine. The write barrier elimination routine eliminates a write barrier for an intergenerational pointer between an object stored in hot space and an object stored in cold space. The write barrier elimination routine preferably eliminates a write barrier by replacing machine code instructions for a write barrier with no operation machine code instructions.

The sample and partition preferably defines an object to be hot or cold dependent on object type mortality. Object type mortality is estimated dependent on the difference of the number of bytes of the object type stored in the heap before a collection and the number of bytes of the object type stored in the heap after the collection.

The sample and partition may partition the heap to minimize intergenerational pointers between hot space and cold space. The collection routine copies referenced hot objects to a new page in hot space.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5A is a block diagram illustrating components of the garbage collector shown in FIG. 1;

DETAILED DESCRIPTION OF THE INVENTION

A description of preferred embodiments of the invention follows.

Figure 1:
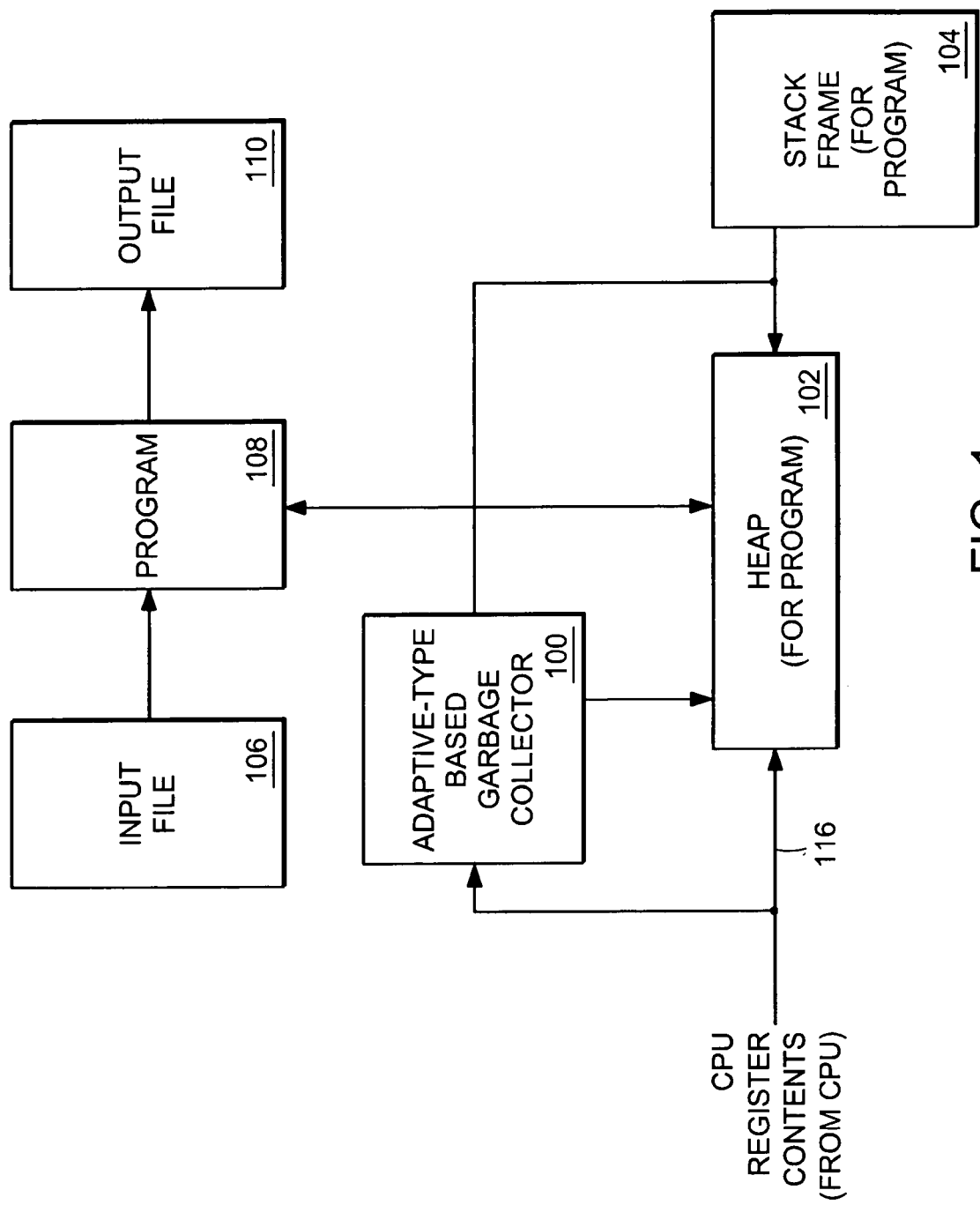
FIG. 1 is a block diagram illustrating the use of a garbage collector to reclaim memory in a heap for an executing program according to the principles of the present invention.

FIG. 1 is a block diagram illustrating the use of a garbage collector 100 to reclaim memory in a heap 102 for an executing program 108 according to the principles of the present invention. The program 108 processes data stored in an input file 106 and generates an output file 110. For example, the program may be a parser which processes a source code file and generates a parsed file or the program may be a database search program which searches a database for entries including a keyword and generates a list of database entries including the keyword. The program is written in a programming language that provides a type for each object.

While the program 108 executes, a heap 102 is allocated for the program 108 by the operating system. The heap 102 is an area of computer memory from which the executing program 108 can request (allocate) memory in which to store objects. The adaptive based garbage collector 100 manages the heap 102 for the program 102 by reclaiming memory storing objects which are no longer referenced by the executing program 108.

A stack frame 104 stores a root list of pointers to objects stored in the heap 102. Pointers to objects stored in the heap 102 are also stored in the registers 116 of the processor (not shown) in the computer system executing the program 108.

The garbage collector 100 determines which of the objects stored in the heap 102 may be reclaimed dependent on pointers to objects in the heap 102 stored in the registers 116 and the stack frame 104.

The root set of pointers for the program 108 consists of all pointers stored in the stack frame 104 and pointers stored in the registers 116. An object is reachable if it is a member of the root set or pointed to by a reachable object. The set of reachable objects forms a directed graph. An object can be reclaimed if it is no longer reachable by the program 108. The adaptive-type based garbage collector 100 reclaims non-reachable objects for use by the program 108.

Figure 2:
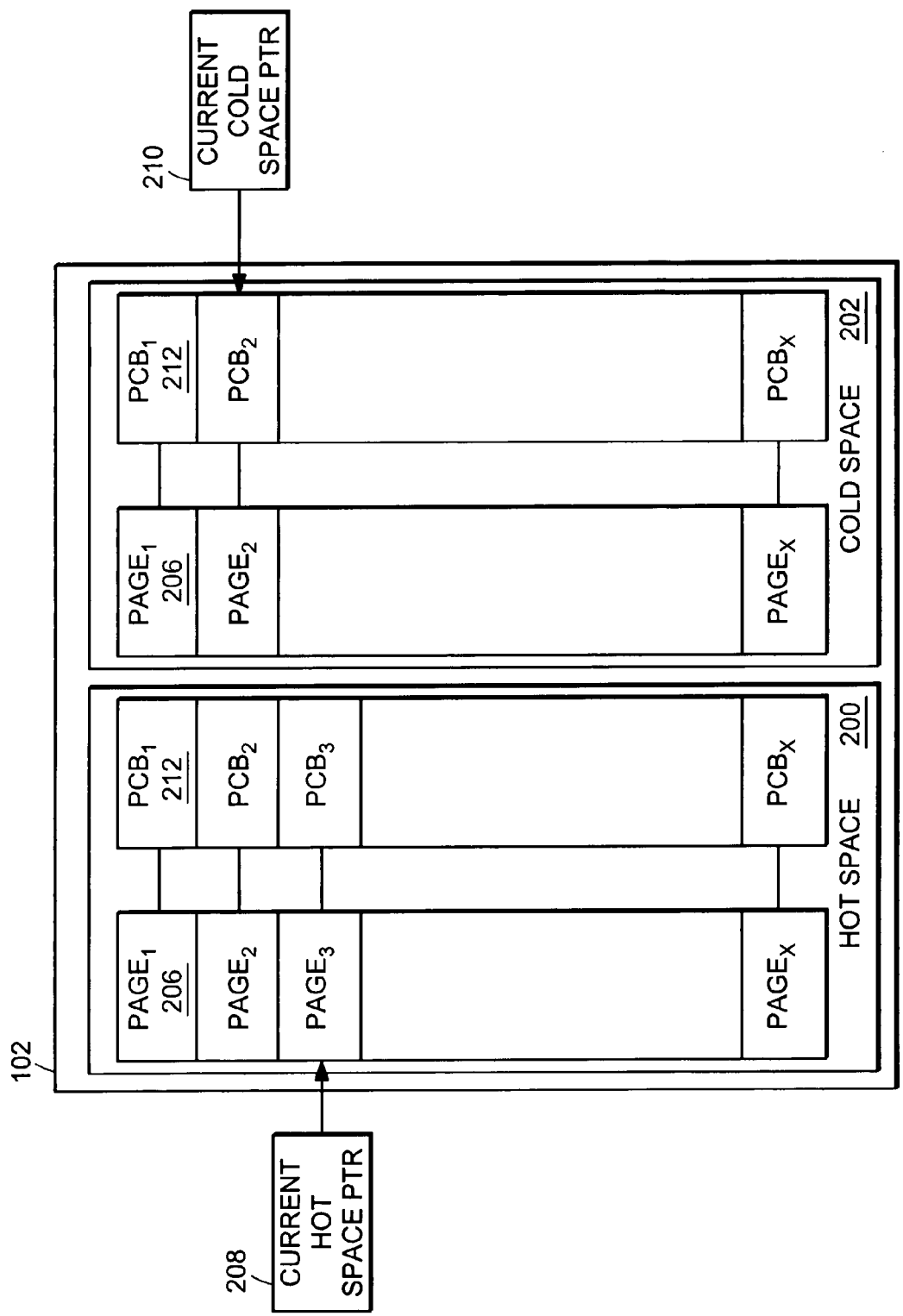
FIG. 2 is a block diagram illustrating the logical partitioning of the heap shown in FIG. 1 by object category.

FIG. 2 is a block diagram illustrating the logical partitioning of the heap 102 shown in FIG. 1. The initial size of the heap 102 provided to the executing program is specified before executing the program. For example, the heap size may be specified by the user in the command issued to request execution of the program. The heap 102 may grow as necessary while the program is executing.

The heap 102 is physically subdivided into a plurality of same size pages 206. Each page 206 is a fixed number of bytes. For example, the heap may be subdivided into 4 Kilobyte pages. However, the number of bytes per page is not limited to 4 Kilobytes; the number of bytes per page may be greater or less than 4 Kilobytes.

The garbage collector 100 logically partitions the heap 102 into two spaces, a hot space 200 and a cold space 202. It is important to note that there is no physical division between pages 206 stored in hot space 200 and pages 206 stored in cold space 202. The space in which a page 206 is located is dependent on a space identifier stored in a Page Control Block ("PCB") 212 associated with the page 206. The program 108 allocates memory from the heap 102 in which to store an object by requesting memory from a page 206 in the hot space 200 or the cold space 202 dependent on the object's category.

An object is allocated to a page 206 in hot space 200 if the object category is 'hot'; that is, it is likely not to be a long-lived object and thus it is highly probable that the garbage collector 100 will be able to reclaim the object. An object is allocated to a page 206 in cold space 202 if the object's category is 'cold'; that is, likely that it is a long-lived object and thus it is less probable that the garbage collector 100 will be able to reclaim the object.

The number of logical spaces is not limited to the two spaces, hot space 200 and cold space 202 shown. The heap 102 may be partitioned into more than two logical spaces with objects assigned a preferred space dependent on how likely it is that the object may no longer be referenced by the program 108.

Each space 200, 202 includes a current space pointer 208, 210. The current space pointer 208, 210 stores the address of the next available location in a page 206 in the space 200, 202 in which the program 108 may store an object. The program 108 stores the next hot object in the location in the page 206 in hot space 200 stored in (referenced by) the current hot space pointer 208. The program stores the next cold object in the location in the page 206 in cold space 202 stored in (referenced by) the current cold space pointer 210.

Figure 3:
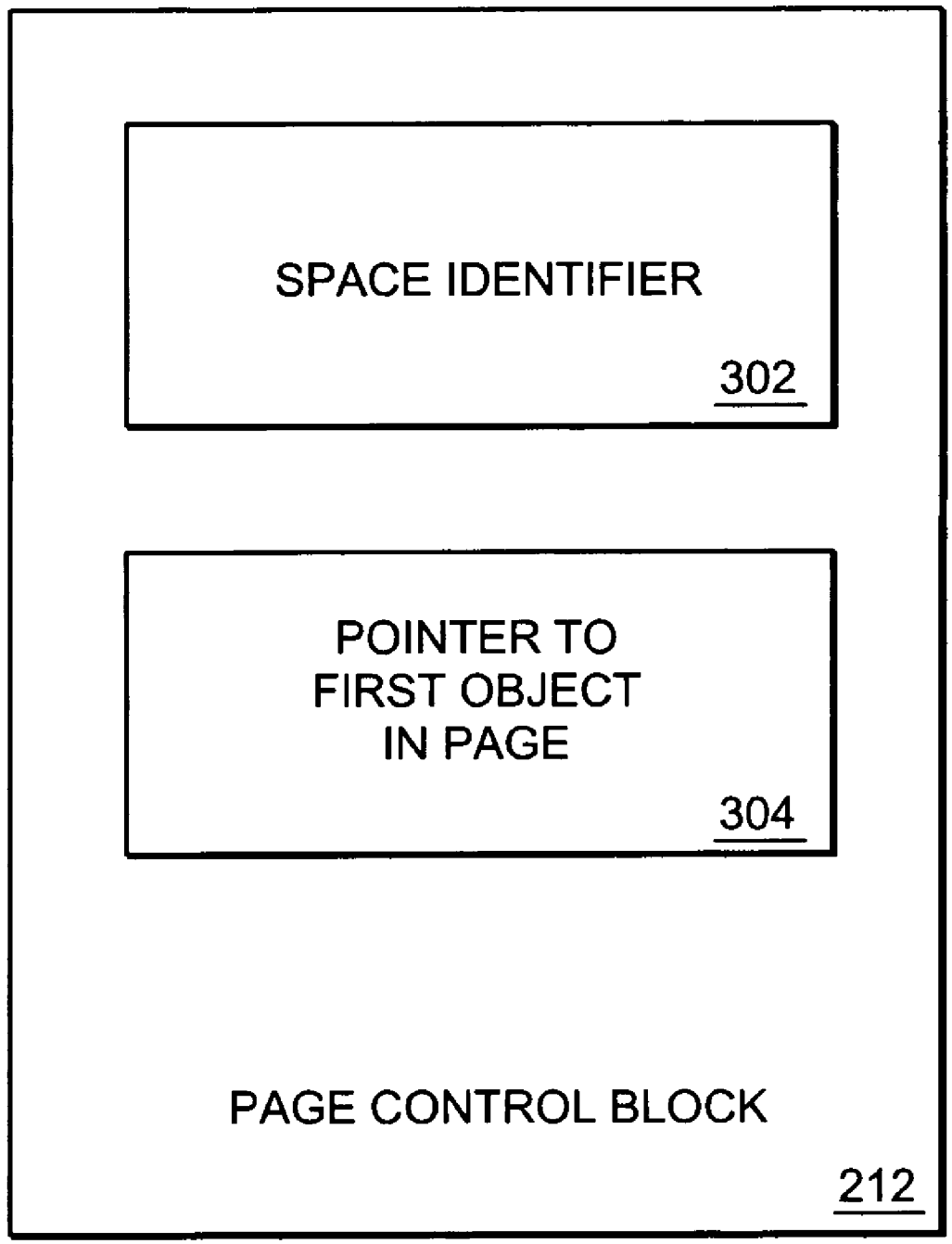
FIG. 3 is a block diagram illustrating one of the PCBs associated with any one of the pages shown in FIG. 2.

FIG. 3 is a block diagram illustrating one of the PCBs 212 associated with any one of the pages 206 shown in FIG. 2. The PCB 212 includes a space identifier 302 and a pointer 304 to the first object stored in the page 206. A page 206 may be a member of hot space 200 or cold space 202 dependent on the state of the space identifier 302 stored the PCB 212 associated with the page 206.

The space identifier 302 for a heap 102 logically partitioned into hot space 200 and cold space 202 as shown in FIG. 2 may be implemented as a single byte storing a hot space identifier or a cold space identifier. Thus, a page 206 may effectively be moved between cold space 202 and hot space 200 by modifying the space identifier 302 in the PCB 212 associated with the page 206.

Figure 4:
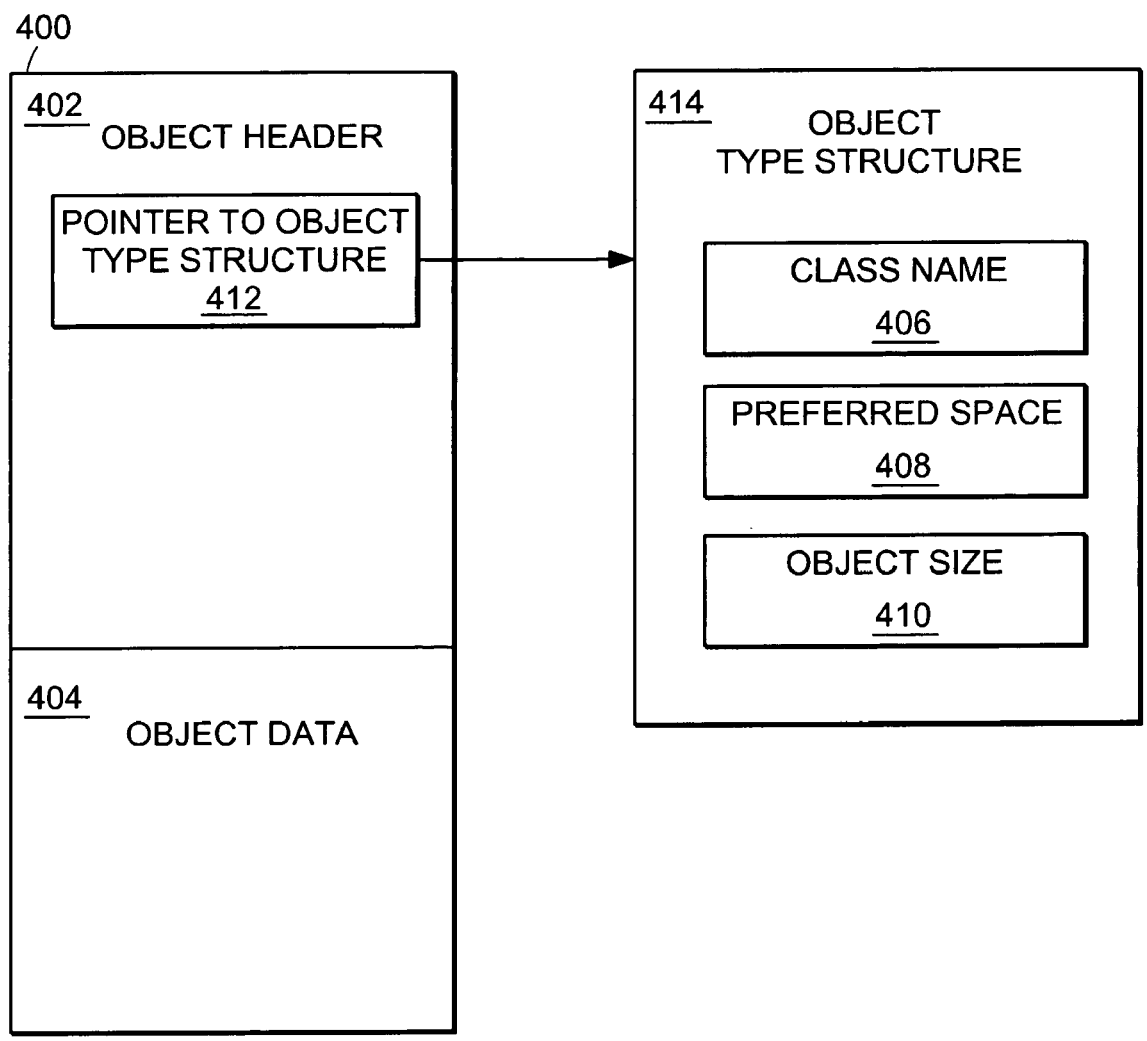
FIG. 4 is a block diagram illustrating an object stored in any one of the pages shown in FIG. 2.

FIG. 4 is a block diagram illustrating an object 400 stored in any one of the pages 206 shown in FIG. 2. The object 400 includes an object header 402 and object data 404. The object header 402 includes a pointer to an object type structure 412. There is one object type structure 414 per object type. The object type structure 414 includes a class name field 406, a preferred space field 408 and an object size field 410.

The object size field 410 stores the size of the object type; that is, the number of bytes stored in the object header 402 and the object data 404. The class name field 406 stores the class name of the object type. The class name is assigned by the program language. For example, in the Java™ programming language, the class name assigned to an object may be "char[ ]" if the object type is an array of characters. The contents of the preferred space field 408 stores an indication of the preferred space, that is; hot space 200 or cold space 202, in which an object 400 of this object type may preferably be stored. The contents of the preferred space field 408 thus indicates the category of the object type; that is whether the object category is hot or cold. The contents of the preferred space field 408 for each object stored in the heap 102 is defined by the garbage collector 100. The method for defining the preferred space for an object 400 is described later in conjunction with FIG. 7.

Objects 400 are added sequentially to a page 206. Thus, the next object for an object type of the list category is stored in a page 206 in hot space 200 starting at the location identified by the current hot space pointer 208. A plurality of objects 400 may be stored in each page 206, the number of objects stored in a page 206 is dependent on the size of each object 400 and the size of the page 206. For example, eight 512 byte objects and four 1 Kilobyte objects can be stored in an 8 Kilobyte page 206. The location of the start of the first object stored in the page 206 is stored in the pointer 304 to the first object in a page 206 in the PCB 212 associated with the page 206. The start address for the second object 400 stored in the page 206 can be determined from the start location and the size of the first object 400 stored in the page 206. The start addresses for succeeding objects 400 stored in the page 206 are similarly determined from the start address and size of respective preceding objects 400 stored in the page 206.

FIG. 5A is a block diagram illustrating components of the garbage collector 100 shown in FIG. 1. The adaptive type-based garbage collector 100 includes a hot/cold category list 506, a major collection routine 502, a minor collection routine 500, a sample and partition routine 504, a write barrier elimination routine 510, an object allocation routine 508 and an scan queue 524.

The object allocation routine 508 provides a starting address 518 of a location in a page 206 in the heap 102 in which the program 108 may store an object upon receiving an allocation request 516 from the program 108. The allocation request 516 includes the type of object to be stored in the heap 102. The starting address 518 returned is dependent on whether the object category for the object type is hot or cold.

The minor collection routine 500 searches pages 206 in hot space 200 for referenced objects 400. An object 400 is referenced if the object 400 can be reached directly by a pointer stored in the CPU registers 116 or the stack frame 104 or by another referenced object. Pages including referenced objects are stored in the scan queue 524. The scan queue 524 is only valid while the minor collection routine 500 is collecting objects 400. If an object 400 is unreachable, the memory occupied by the object 400 is reclaimed for use by the object allocation routine 508.

Similar to the minor collection routine 500, the major collection routine 502 reclaims memory for use by the object allocation routine 508. However, the major collection routine 502 searches for referenced objects in both hot space 200 and cold space 202. Thus, the major collection routine 502 consumes more execution time than the minor collection routine 500 because it examines more pages 206. The major collection routine 502 also uses the scan queue 524 while it is reclaiming memory storing non-referenced objects 400.

The object hot/cold category list 506 stores an object category 530 for each object type. The object category 530 identifies hot space 200 or cold space 202 as the preferred space for storing the objects of a particular type. The object hot/cold category list 506 is generated by the sample and partition routine 504. In order to determine the space 200, 202 in which to store an object 400, the object allocation routine 508 reads the preferred space field 408 (FIG. 4) stored in the object header 402. The method for generating the object hot/cold category list 506 is described in conjunction with FIG. 7.

The space identifier 302 in the PCB 212 identifies the space 200, 202 of a page. The space identifier 302 identifies the same space stored in the object category 530 for the object type in the hot/cold category list 506. The collector 100 includes a global variable current_space 525 which may be accessed by all of the routines is 500, 502, 504, 508 and 510. If the space identifier 304 is an odd number, the page 206 is in cold space 202. If the space identifier 304 is an even number and is greater than or equal to the number stored in current_space 525, the page is in hot space 200. If the space identifier 304 is an even number and is less than the number stored in current space 525, the page is free.

During normal program execution, current_space 525 stores an even number. Hot category objects are allocated to pages numbered with current_space 525; that is, hot space 200. Cold category objects are allocated to pages numbered with the number stored in current_space 525 plus 1; that is, cold space 202.

The minor collection routine 500, copies all live hot objects to pages with space identifiers 302 equal to the number stored in current_space 525 plus 2; that is, hot space 200. Also, pages 206 can be conservatively "promoted" by incrementing the number stored in the space identifier 302 by 2. When the minor collection routine 500 completes the collection, the number stored in current_space 525 is incremented by 2. Thus old hot pages are automatically freed, because their space identifiers 302 are even and less than the number stored in current_space 525. Cold pages are not reclaimed by the minor collection routine 500.

The major collection routine 502 renumbers pages 206 with space identifier 302 set to an odd number (cold space 202) with the number stored in current_space 525. Then, the major collection routine 502 copies all live objects to pages 206 with space identifier 302 set to the number stored in current_space 525 plus 1. Thus, live objects on pages 206 stored in cold space 202 are copied to other pages 206 in cold space 202 and live objects on pages 206 stored in hot space 200 are copied to other pages 206 in cold space 202. At the end of the collection, the major collection routine 502 increments current_space 525 by two. Thus, all the old pages automatically become free because their space identifiers 306 are even and less than the number stored in current_space 525.

For example, current_space 525 is set to '2', thus, a page 206 with space identifier 302 set to '1' ("page 1") is in cold space 202, a page 206 with space identifier 302 set to '2' ("page 2") is in hot space 200 and a page 206 with space identifier set to '0' ("page 3") is free. The page 1 stores live and dead cold category objects. The page 2 stores live and dead hot category objects.

Assuming no conservative collection, after the minor collection routine 500 has completed a minor collection, current_space 525 is set to 4. The live object on Page 2 is moved to Page 3 and the space identifier 302 of page 3 is set to '4'. Thus, Page 3 is now in hot space 200 and Page 2 is free. Page 1 is still in cold space 202.

After the major collection routine 502 has completed a major collection. The live cold object on Page 1 is moved to Page 3 and the live object on Page 2 is moved to Page 3. The current space 525 is set to '4'. The space identifier 302 in Page 3 is set to '3'. The space identifier 302 in Page 1 and Page 2 are set to '2'. Thus, Page 3 is in cold space and Page 1 and Page 2 are free.

Current_space 525 is incremented until it reaches a predefined maximum number. In one embodiment the predefined maximum number is 250. Once the predefined maximum number is reached, all the pages 206 in the heap are scanned. Free pages are re-labeled by setting the space identifier 302 to '0'. Cold pages are re-labeled by setting the space identifier 302 to '1'. Hot pages are re-labeled by setting the space identifier 302 to '2'. After the re-labeling is complete, current_space 525 is set to '2'.

The sample and partition routine 504 computes the number of bytes in the heap 102 used to store all objects of each type. The sample and partition routine 504 then calls the major collection routine 500 to perform a major collection. The sample and partition routine 504 defines the object's category to be hot or a cold dependent on the difference of the number of bytes of each object type stored in the heap 102 after the major collection is complete. Having defined an object category for each object type used by the program 108 to be hot or cold, the sample and partition routine stores an object category for each object type in the object hot/cold category list 506.

The write barrier elimination routine 510 determines whether machine code instructions inserted by a compiler to record the location of a pointer in the heap 102 are necessary. Machine code instructions to record the location of the pointer in the heap 102 are typically referred to as a write barrier. A write barrier is not required if the object 400 and a pointer to the object 400 are both stored in the same space 200, 202 or if the object 400 is stored in cold space 202 and the pointer to the object is stored in hot space 200. Thus, the memory referencing machine code instructions may be replaced with No Operation ("NOP") instructions in order to decrease the execution time of the program. The modification of the machine code to eliminate a write barrier is described later in conjunction with FIG. 12B.

Figure 5B:
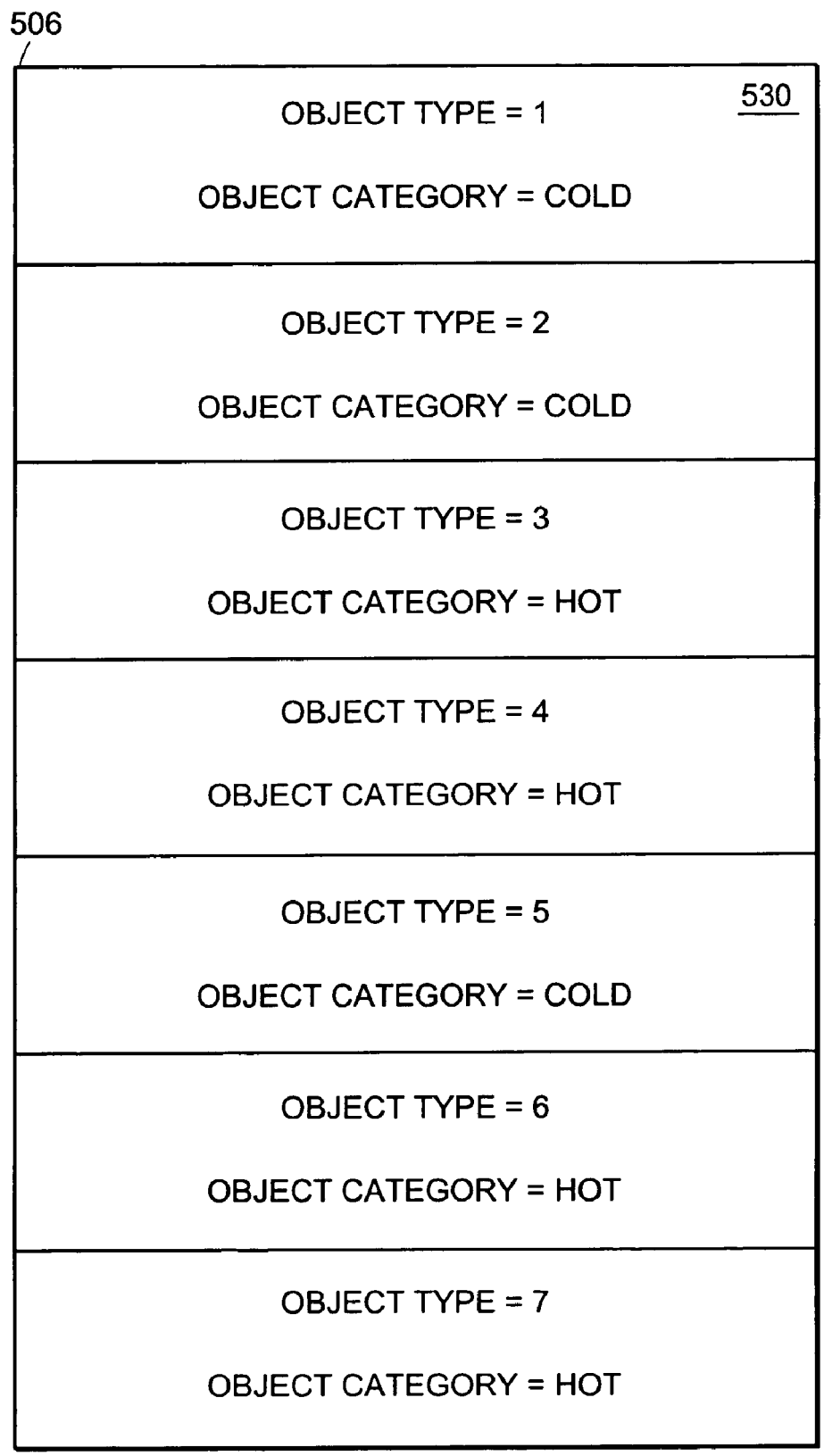
FIG. 5B is a block diagram illustrating the object category hot/cold list shown in FIG. 5A.

FIG. 5B is a block diagram illustrating the object hot/cold category list 506 shown in FIG. 5A. The object hot/cold category list 506 stores an object category 530 for each object type. In the object hot/cold category list 506 shown in FIG. 5B the program language defines seven object types. Object types 1,2 and 5 have been defined as cold category objects and object types 3, 4, 6 and 7 have been defined as hot category objects. The invention is not limited to seven object types, the object hot/cold category list may store more than seven object types. For example, in the Java™ computer programming language the number of object types is unbounded because user defined object types or classes are permitted. A user defined object type may be a Tree or a VideoGame or any other user defined object type.

Figure 6:
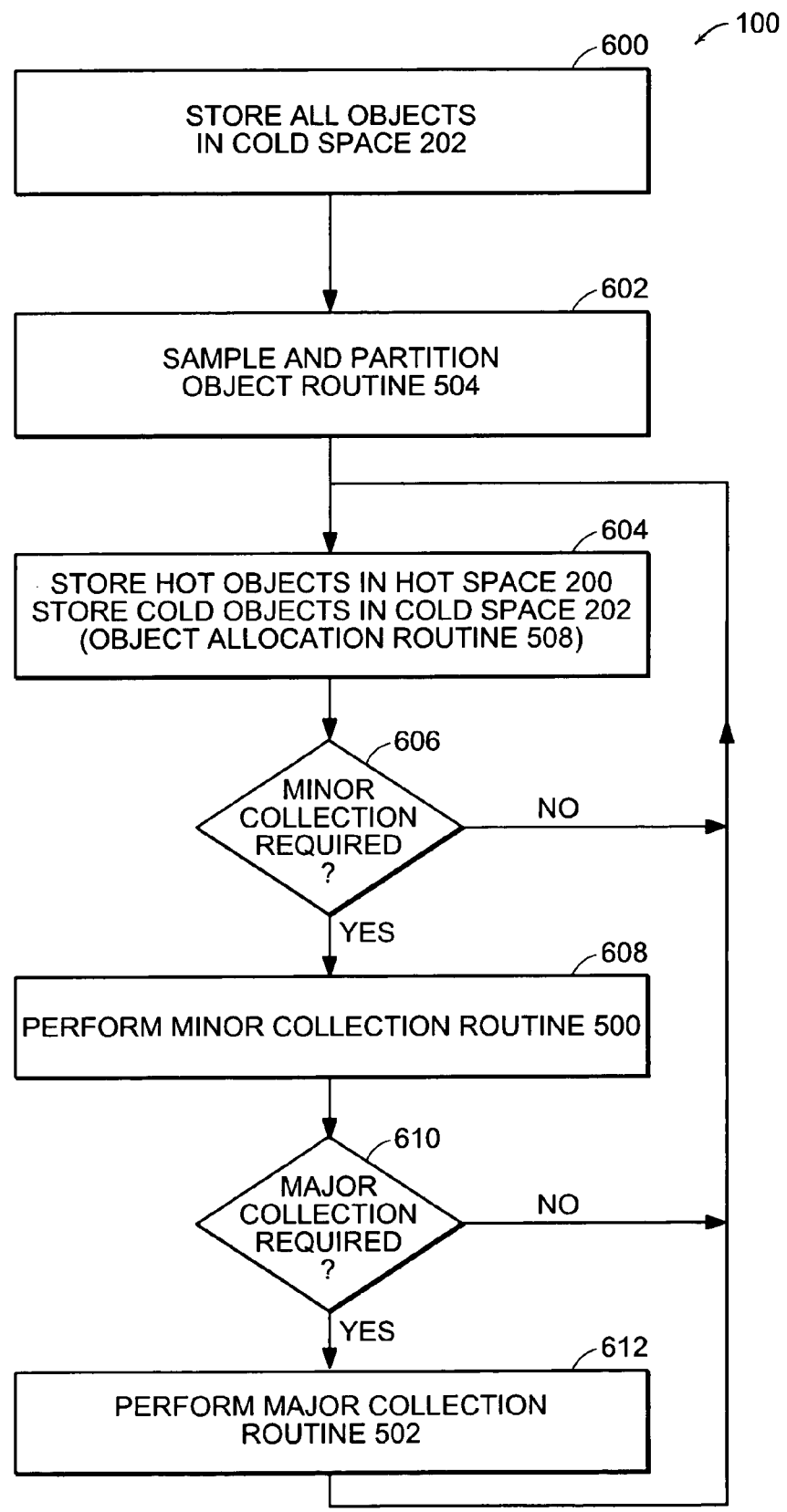
FIG. 6 is a flow chart illustrating the steps performed in the garbage collector shown in FIG. 1 for managing the heap.

FIG. 6 is a flow chart illustrating the steps performed in the garbage collector 100 shown in FIG. 1 for managing the heap 102. The steps are described in conjunction with FIGS. 2,3,4 and 5.

At step 600, initially the object category 530 defined for all object types is cold in the object hot/cold category list 506. The space identifier 302 stored in each PCB 212 associated with a page 206 in the heap 102 identifies the space as cold space 202. Thus, the object allocation routine 508 allocates memory to store the objects in cold space 202 starting at the location stored in the current cold space pointer 210. Processing continues with step 602.

At step 602, the sample and partition routine 504 is called by the object allocation routine 508, after the object allocation routine 508 determines that a first collection 511 is required because there are insufficient pages 206 available in the cold space 202 for allocation to the executing program 108. The sample and partition routine 504 requests a collection by the major collection routine 502. After the collection is complete, the sample and partition routine 504 defines a category for each object type as described in conjunction with FIG. 7. Alternatively, the sample and partition 504 may use statistics from a previous execution of the program 108 to define a category for each object type.

Having defined a category for each object type to be a hot or cold, the sample and partition routine 504 stores an object category 530 for the object type in the object hot/cold category list 506. Then, the sample and partition routine 504 copies all objects to cold space 202. Processing continues with step 604.

At step 604, upon receiving a request 516 for allocation of memory for an object 400 of a particular type from the program 108, the object allocation routine 508 examines the object category 530 corresponding to the object type stored in the object hot/cold category list 506. If the object category 530 is hot, the object allocation routine 508 stores the object 400 starting at the location in the page 206 in hot space 200 pointed to by the current hot space pointer 208. If the object category 514 is cold, the object allocation routine 508 stores the object 400 starting at the location in the page 206 in cold space 202 pointed to by the current cold space pointer 210. Processing continues with step 606.

At step 606, the object allocation routine 508 determines if a minor collection is required as described above. If not, processing continues with step 604. If so, processing continues with step 608.

At step 608, the minor collection routine 500 performs a minor collection to reclaim non-referenced memory in hot space 200 for use by the object allocation routine 508. The method for performing a minor collection is described in conjunction with FIG. 8.

At step 610, after the minor collection routine 500 reclaims memory storing non-referenced objects, the object allocation routine 508 determines if a major collection is required. A major collection is required if the minor collection did not reclaim sufficient memory for use by the object allocation routine 508. The object allocation routine 508 also requests a major collection if the retention rate of a minor collection exceeds that of the retention rate of the last major collection. Retention rates are estimated by counting the number of pages 206 in use before and after collection. If a major collection is required, processing continues with step 612. If not, processing continues with step 604 described above.

At step 612, the major collection routine 502 performs a major collection. A major collection examines both hot space 200 and cold space 202 for memory storing referenced objects 400 and reclaims the memory storing non-referenced objects 400 for use by the object allocation routine 508. The method for performing a major collection is described in conjunction with FIG. 8. Processing continues with prior step 604.

Figure 7:
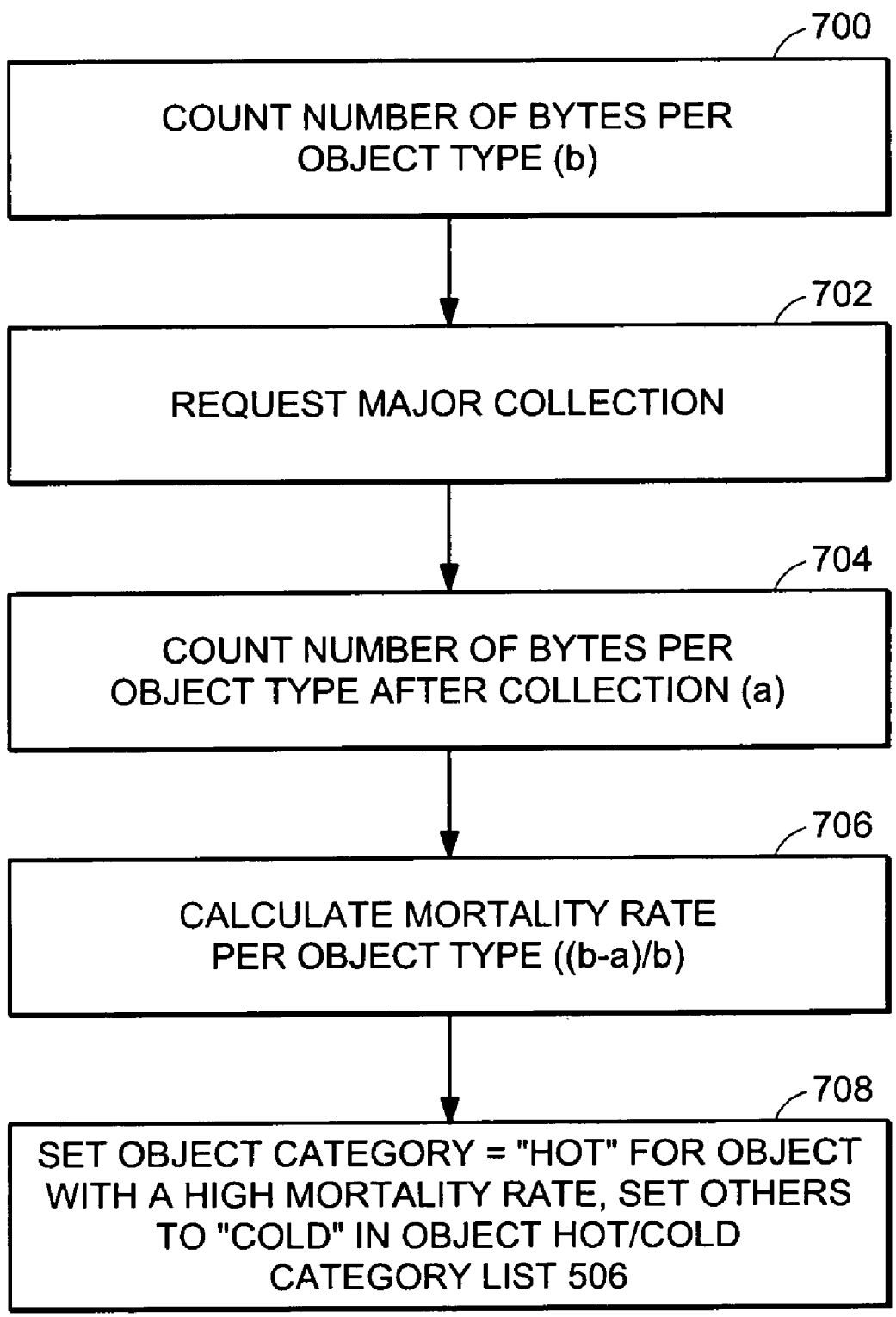
FIG. 7 is a flow chart illustrating the steps performed in the sample and partition routine shown in FIG. 5 for assigning hot and cold categories to object types and logically partitioning the heap.

FIG. 7 is a flow chart illustrating the steps performed by the sample and partition routine 504 shown in FIG. 5 for defining an object category 530 for an object type and logically partitioning the heap 102.

At step 700, the sample and partition routine 504 counts the number of bytes used in the heap 102 per object class stored in the class name field 406 in the object 400 and stores the number of bytes in parameter 'b'. To count the number of bytes, the sample and partition 504 searches each page 206 for objects 400 by reading the class name field 406 and the object size 410 in the object header 402 and determining the location of the start of the next object stored in the page 206. The starting location of the next object 400 in the page 206 is determined from the size of the previous object 400. The sample and partition 504 counts the number of bytes for each object class stored in the heap 102. Alternatively, the sample and partition may randomly select objects for which to count bytes. One method for randomly selecting object types selects a random subset of pages and counts the number of each object type stored in these pages 206. Processing continues with step 702.

At step 702, the sample and partition routine 504 calls the major collection routine 502 to perform a major collection. The method for performing a major collection is described in conjunction with FIG. 8. Processing continues with step 704.

At step 704, the sample and partition routine 504 counts the number of bytes per object type after the major collection and stores the number of bytes in parameter 'a'. The method used to count the number of bytes after the major collection is the same method described in conjunction with step 702. Processing continues with step 706.

At step 706, the sample and partition routine 504 calculates the mortality rate for each object type found in the heap 102 using the below algorithm.

$$\text{mortality} = ((b-a)/b)$$

where:
a=number of bytes of the object type stored in the heap before the minor collection
b=number of bytes of the object type stored in the heap after the minor collection The mortality of an object type is a measure of how likely the object of the type are to survive a collection. The category of an object type with a high mortality probability is defined to be hot. The category object type with a low mortality probability is defined to be cold. Processing continues with step 708.

At step 708, the sample and partition routine 504 stores an object category 530 for each object type in the object hot/cold category list 506. The object category 530 is dependent on the calculated mortality of the object class. The object hot/cold category list 506 is provided for the object allocation routine 508 so that in subsequent memory allocations for objects 400, the object allocation routine 508 can determine whether to store the object 400 dependent on the type of the object in hot space 200 or cold space 202 in the heap 102. Processing continues with step 710.

Figure 8:
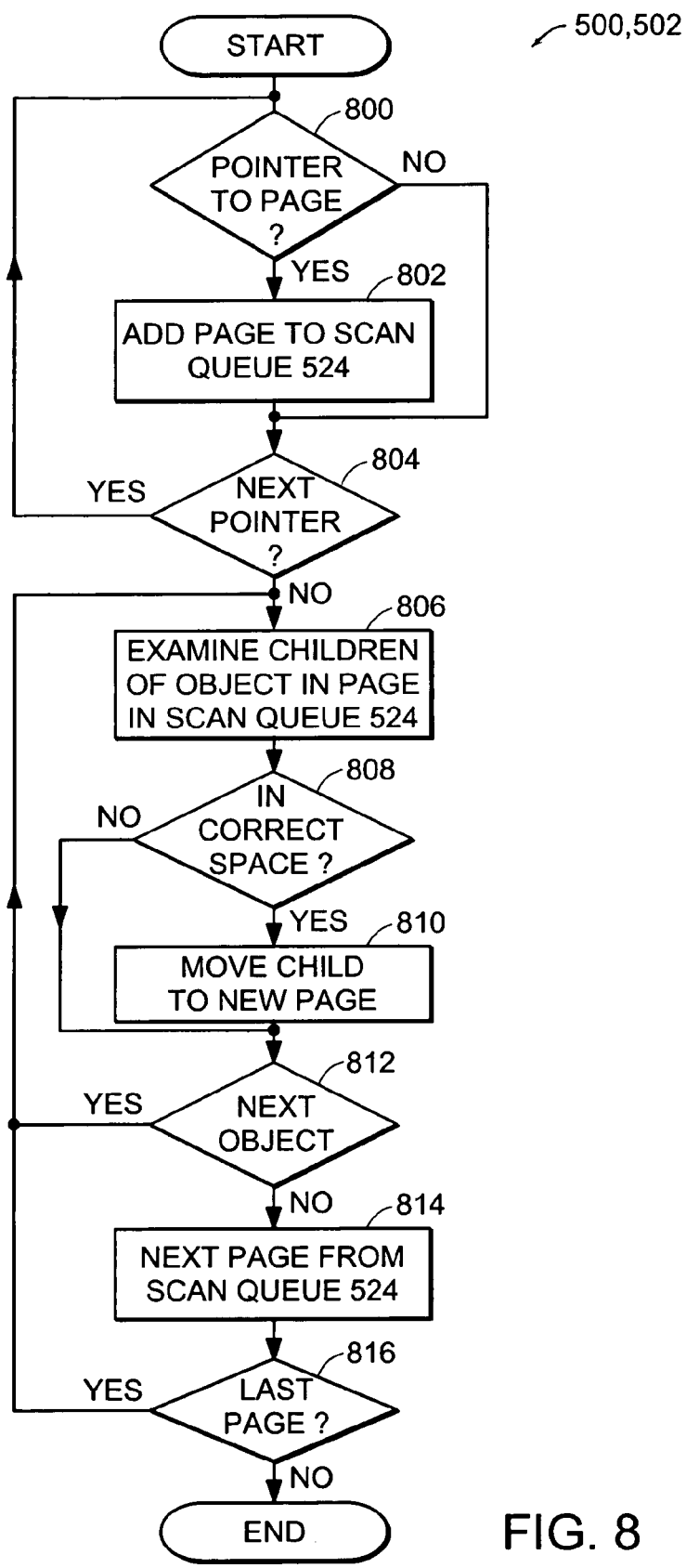
FIG. 8 is a flow chart illustrating the steps performed in either the major collection routine or the minor collection routine shown in FIG. 5.

FIG. 8 is a flow chart illustrating the steps performed in either the major collection routine 502 or the minor collection routine 500 shown in FIG. 5. In an alternative embodiment the major collection routine 502 and the minor collection routine 500 may be implemented as a single collection routine, with the collection routine having a collection type argument requesting a major or minor collection.

At step 800, the collection routine 500, 502 examines a pointer stored on the stack frame 104 or in one of the CPU's registers 116 and determines if the pointer points to a location in a page 206 in the heap 102. If performing a minor collection, the minor collection routine 500 determines if the pointer points to a location in a page 206 in hot space 200. If performing a major collection, the major collection routine 502 determines if the pointer points to a location in a page 206 in hot space 200 or cold space 202 in the heap 102. If so, processing continues with step 802. If not, processing continues with step 804.

At step 802, a pointer to the start of the page 206 is added to the scan queue 524. The scan queue 524 includes a list of pointers to pages 206 in the heap 106 in which there is at least one referenced object. If the collector (a conservative collector) 100 executes in a system in which the compiler cannot distinguish whether the contents of the stack frame 104 are pointers or data, the collection routine 500, 502 moves all the pages 206 pointed to by the stack frame 104; that is, the root pages, to an unclaimable region in hot space 200. A page 206 is moved by relabeling the space identifier 302 of the page 206. Processing continues with step 804.

At step 804, the collection routine 500, 502 determines if there is another pointer stored in the stack frame 104 or in one of the CPU's registers 116 to be examined. If so, processing repeats beginning with step 800. If not, processing continues with step 806.

At step 806, the collection routine 500, 502 examines the pages 206 stored in the scan queue 524. The collection routine 500, 502 examines objects in pages 206 reachable from a root page and objects reachable from reachable objects by performing a breadth-first search from the root pages. If the collection routine 500, 502 finds a reachable object processing continues with step 810. If not, processing continues with step 812.

At step 810, the collection routine 500, 502 determines whether to move objects pointed to by pointers stored in the current object (the children of the current object) to a new page 206. If performing a minor collection and the child is in hot space 200, the minor collection routine 502 moves the reachable object to a newly allocated page 206 in hot space. If performing a major collection, the major collection routine 500 moves an object of the hot category and an object of the cold category to a newly allocated page 206 in cold space 202. Processing continues with step 812.

At step 812, the collection routine 500, 502 determines if there is another reachable object stored in the current active page. If so, processing continues (repeats) with step 806. If not, processing continues with step 814.

At step 814, the collection routine 500, 502 gets the pointer to the next page 206 in which to search from the scan queue 524. Processing continues with step 816.

At step 816, the collection routine 500, 502 determines if all the active pages in the scan queue 524 have been searched for reachable objects 400. If so, the collection is complete. If not, processing continues with step 806 as described above.

Figure 9A:
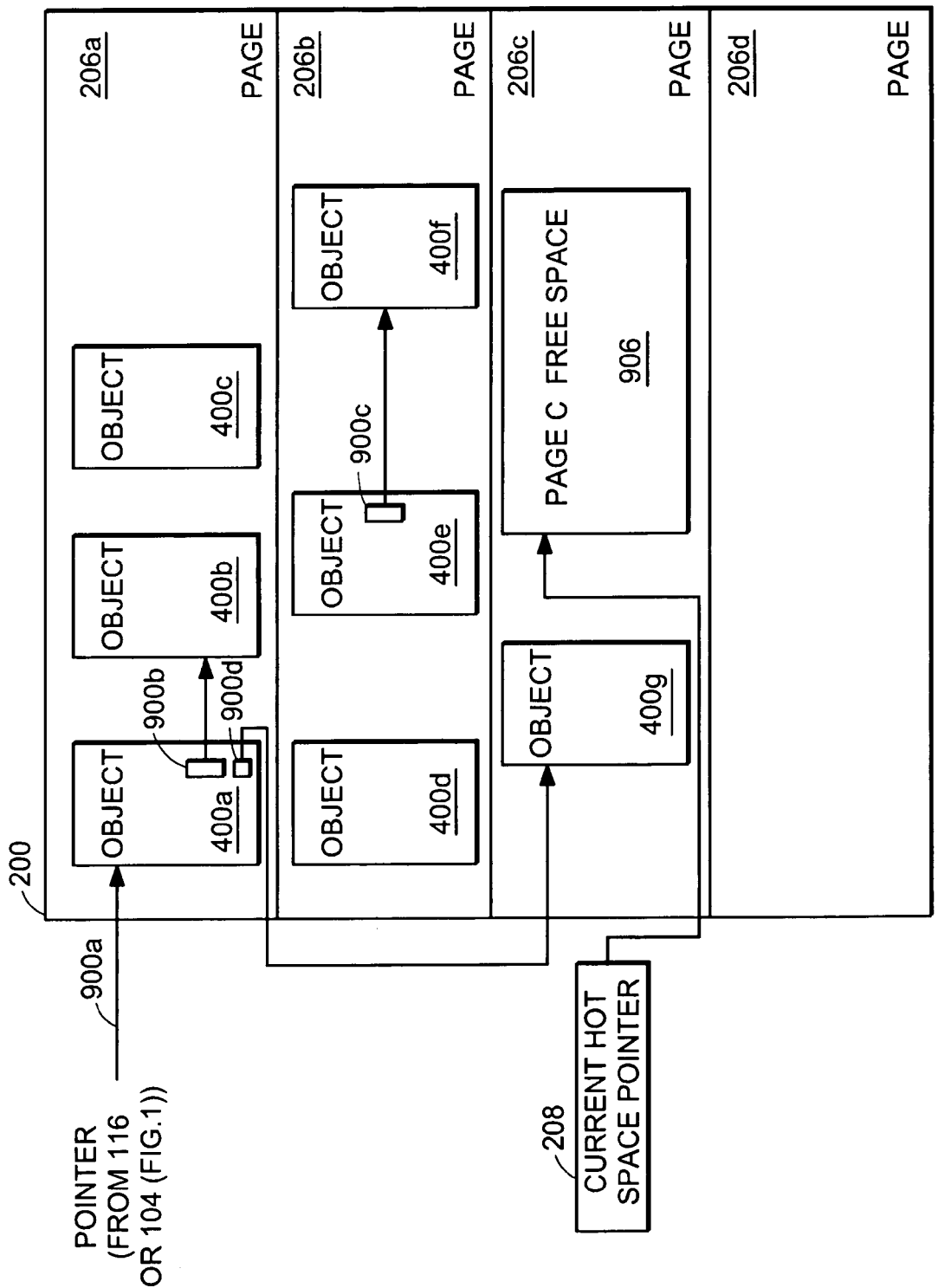
FIG. 9A is a block diagram showing hot space in the heap before a minor collection is performed by the minor collection routine shown in FIG. 5.

FIG. 9A is a block diagram showing objects 400 stored in hot space 200 in the heap 102 before a minor collection is performed by the minor collection routine 500 shown in FIG. 5. As shown in FIG. 9A, the hot space 200 includes four pages 206a, 206b, 206c and 206d. Three objects 400a, 400b and 400c are stored in page 206a, three objects 400d, 400e and 400f are stored in page 206b and one object 400g is stored in page 206c.

Page 206c includes Page C free space 906. Page C free space 906 is memory available in the page 206c for storing objects 400. The current hot space pointer 208 stores the address of the first location in Page C free space 906.

Page 206a includes two referenced objects 400a and 400b. Object 400a is referenced by pointer 900a stored in the stack frame 104 or in a CPU register 116 and object 400b is referenced by pointer 900b stored in referenced object 400a. Page 206b includes one referenced object 400f which is referenced by pointer 900c stored in object 400e. Page 206c includes one referenced object 400g. Object 400g is referenced by pointer 900d stored in referenced object 400a.

Pointer 900a to object 400a in page 206a is a member of the root set of pointers stored in the stack 104 (FIG. 1) or in one of the CPU registers 116. Object 400a is an active page because it is referenced by one of the root set of pointers and hence a pointer to page 206a is stored on the scan queue 524. A pointer to page 206b or 206c is not on the scan queue 524 because neither page 206b or page 206c is referenced by one of the root set of pointers.

After a pointer to active page 206a has been discovered, the pointer to page 206a is added to the scan queue 524, the minor collection routine 500 searches in the pages 206 referenced by pointers stored in the scan queue 524 for children of the objects 400 stored in the pages 206. Object 400a is a reachable object stored in page 206a because it is directly referenced by pointer 900a which is a member of the root set of pointers. Object 400b in page 206c is reachable because it is indirectly reachable through pointer 900b which is stored in reachable object 400a. Similarly, object 400g is reachable because it is indirectly reachable through pointer 900d which is stored in reachable object 400a.

However, object 400f stored in page 206b is deemed not reachable, even though it is referenced by pointer 990c stored in object 400e because object 400e is not directly or indirectly reachable by a pointer which is a member of the root set of pointers.

Figure 9B:
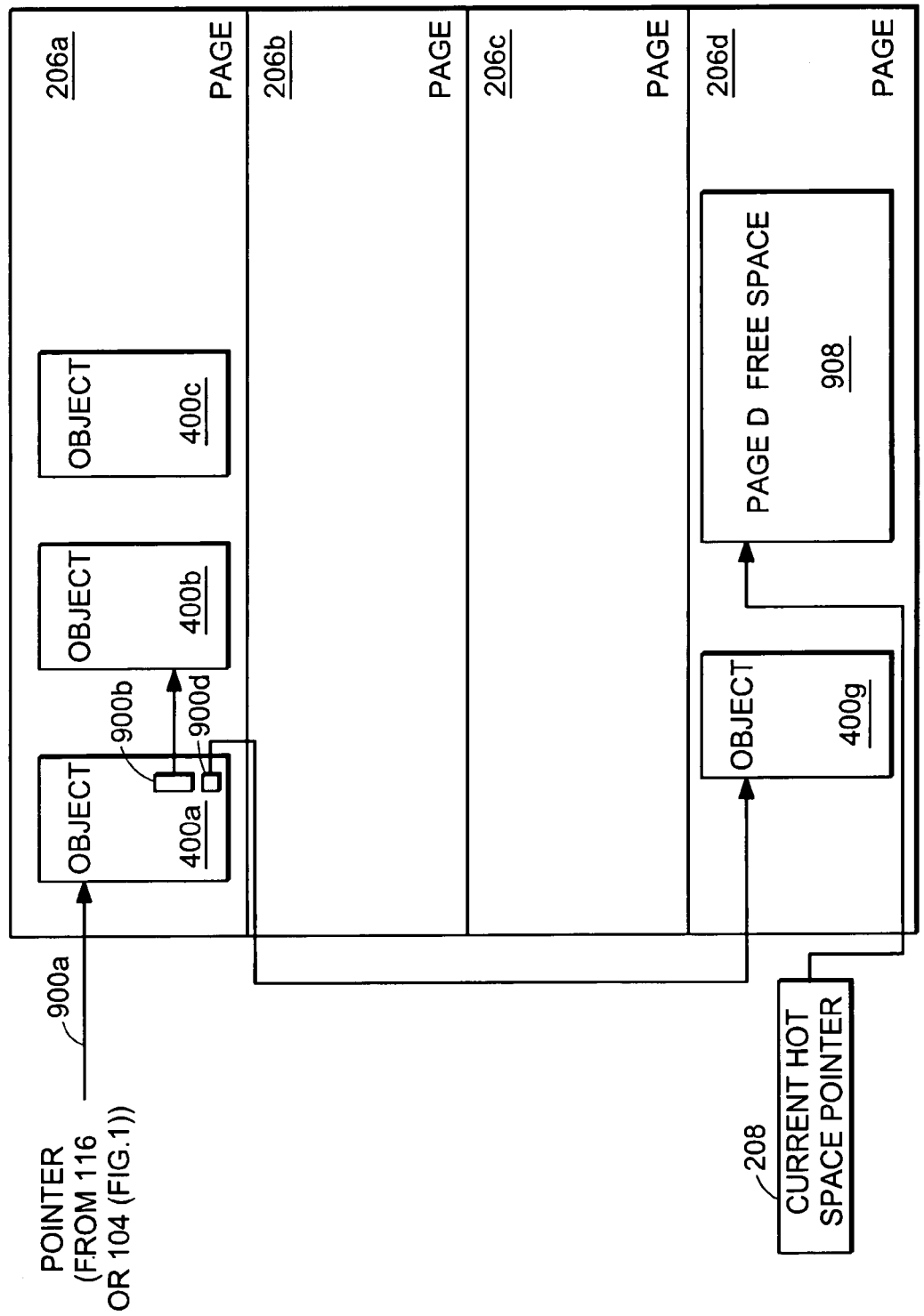
FIG. 9B is a block diagram showing the collectable partition of the heap after a minor collection is performed by the minor collection routine shown in FIG. 5.

FIG. 9B is a block diagram showing hot space 200 after a minor collection is performed by the minor collection routine 500 on the pages 206a, 206b, 206c shown in FIG. 9B. Page 206b and 206c have been reclaimed by the minor collection routine 500 and are available for allocation by the object allocation routine 508.

Figure 10:
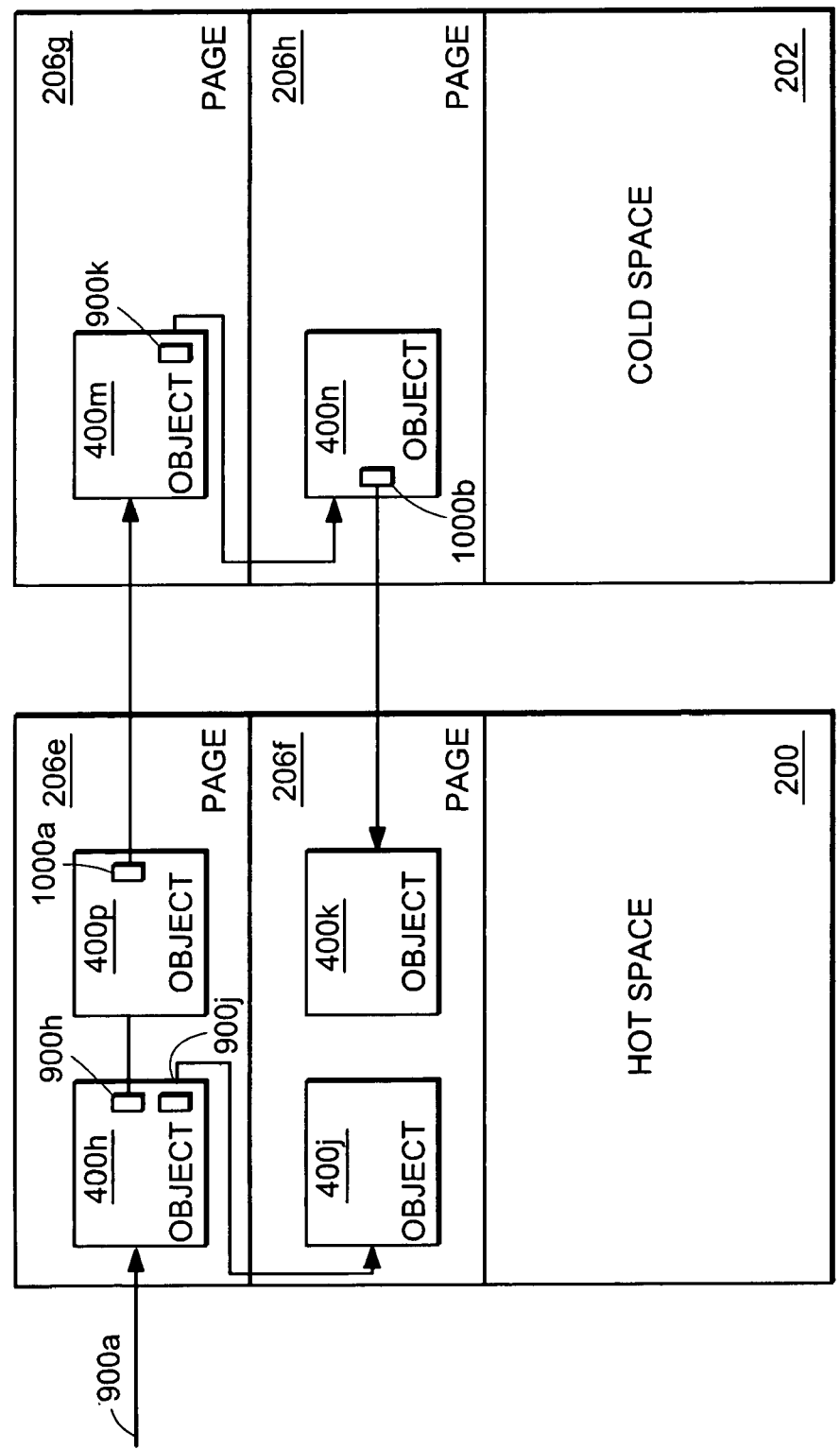
FIG. 10 is a block diagram of the heap logically partitioned into hot space and cold space illustrating intergenerational pointers.

FIG. 10 is a block diagram of the heap 102 logically partitioned into hot space 200 and cold space 202 illustrating intergenerational pointers 1000a, 1000b. An intergenerational pointer is a pointer to an object in the other space. Intergenerational pointer 1000a is a pointer from hot space 200 to cold space 202 and intergenerational pointer 1000b is a pointer from cold space 202 to hot space 200.

Object 400p in page 206e in hot space 200 includes intergenerational pointer 1000a to object 400m in page 206g in cold space 202. Object 400n in page 206h in cold space 202 includes an intergenerational pointer 1000b to object 400k in page 206f in hot space 200. Machine code instructions to store the location of intergenerational pointers 1000a, 1000b are generated when a program 108 is compiled to generate machine code instructions. The set of machine code instructions to store the location are typically referred to as a write barrier. A compiler typically generates a write barrier for every pointer store.

The write barrier consumes program execution time and may not always be necessary. A write barrier is not necessary if it is a pointer from hot space 200 to cold space 202. Thus, the garbage collector ignores all recorded pointers from hot space. For example, intergenerational pointer 1000a stored in object 400p in hot space 200 points to object 400m in cold space 202. Upon executing a minor collection in hot space, object 400p is not reclaimed because it is referenced by an object stored in hot space 200 as follows: pointer 900h stored in object 400h stored in hot space 200 points to object 400p and pointer 900a which is a member of the root set of pointers, points to 400h stored in hot space 200. Thus, intergenerational pointer 1000a from hot space 200 to cold space 202 is not required to perform a minor collection.

However, intergenerational pointer 1000b from object 400n stored in cold space 202 points to object 400k stored in hot space 200. Intergenerational pointer 1000b is required so that the intergenerational pointer 1000b can be referenced in the minor collection and object 400k will not be reclaimed as an unreferenced object. Otherwise, upon executing a minor collection in hot space 200, object 400k would be reclaimed because it is not directly referenced by any object in hot space 200 even though object 400k is directly referenced by object 400n in cold space 202.

Figure 11:
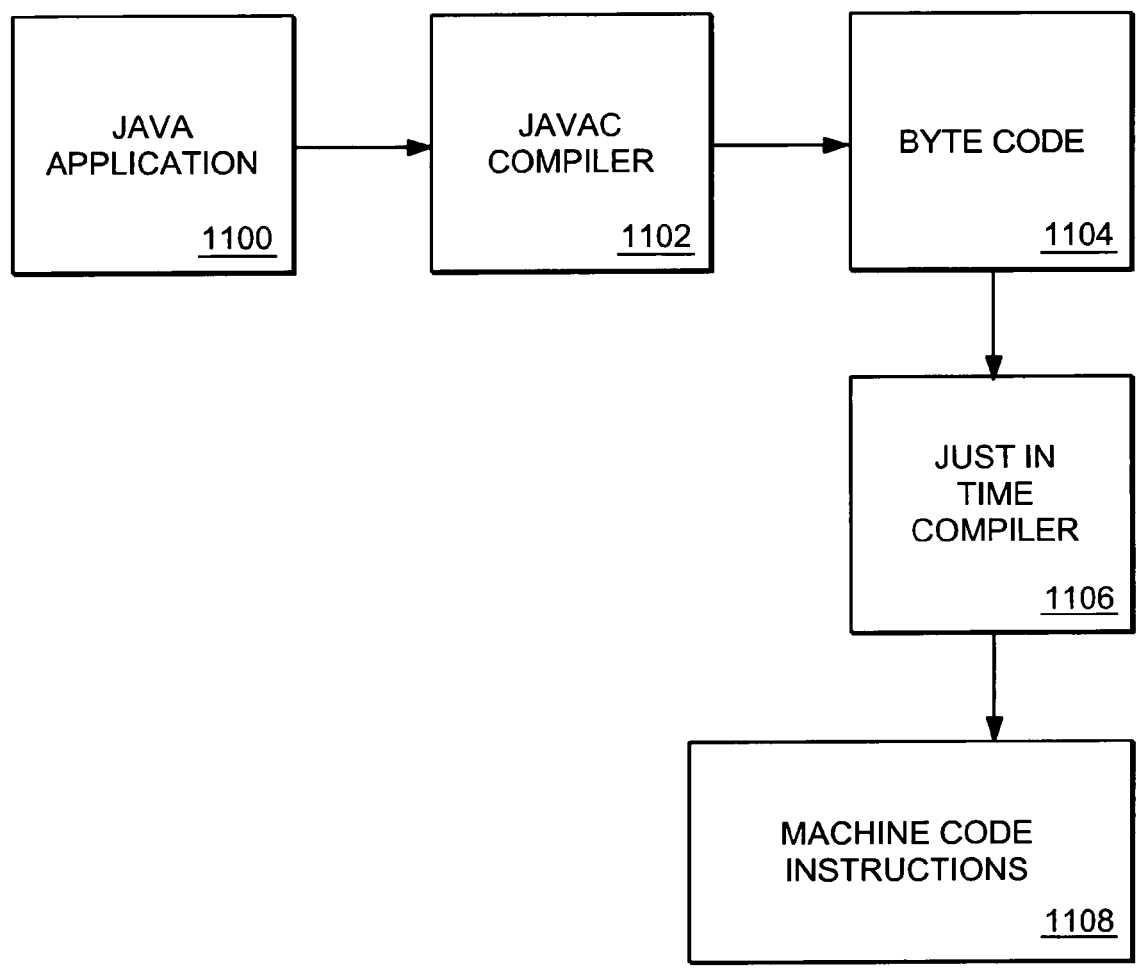
FIG. 11 is a block diagram showing the components required to generate machine instructions for a Java™ application in which write barriers may be eliminated.

FIG. 11 is a block diagram showing the components required to generate machine code instructions 1108 for a Java™ application 1100 in which write barriers may be eliminated. The Java™ application 1100 is architecturally neutral. The byte code file 1104 is hardware and operating system independent. In order to execute the Java™ application 1100, a just in time compiler 1106 compiles the byte code 1104 into executable machine code instructions 1108.

Java™ is a strongly typed language; that is, every variable must have a declared type. The type of an object can be easily determined. In Java™ primitive object types include char, boolean, int, short, long and byte. Primitive object types are not allocated in the heap 102 (FIG. 1). Non-primitive object types (reference types) are allocated in the heap 102 (FIG. 1). Non-primitive object types may be used to represent a string, title, backgroundcolor, link, document, form, anchor, image and web page. For example, a Webpage class object may include a Title, a Backgroundcolor and a Link to another Webpage object. A document class may include an Image, a Form and a Password.

As the just in time compiler 1106 is converting the byte code 1104 to machine code instructions 1108, the just in time compiler 1106 adds write barriers for each intergenerational pointer 1000*a*, 1000*b* in the byte code 1104.

Figure 12A:
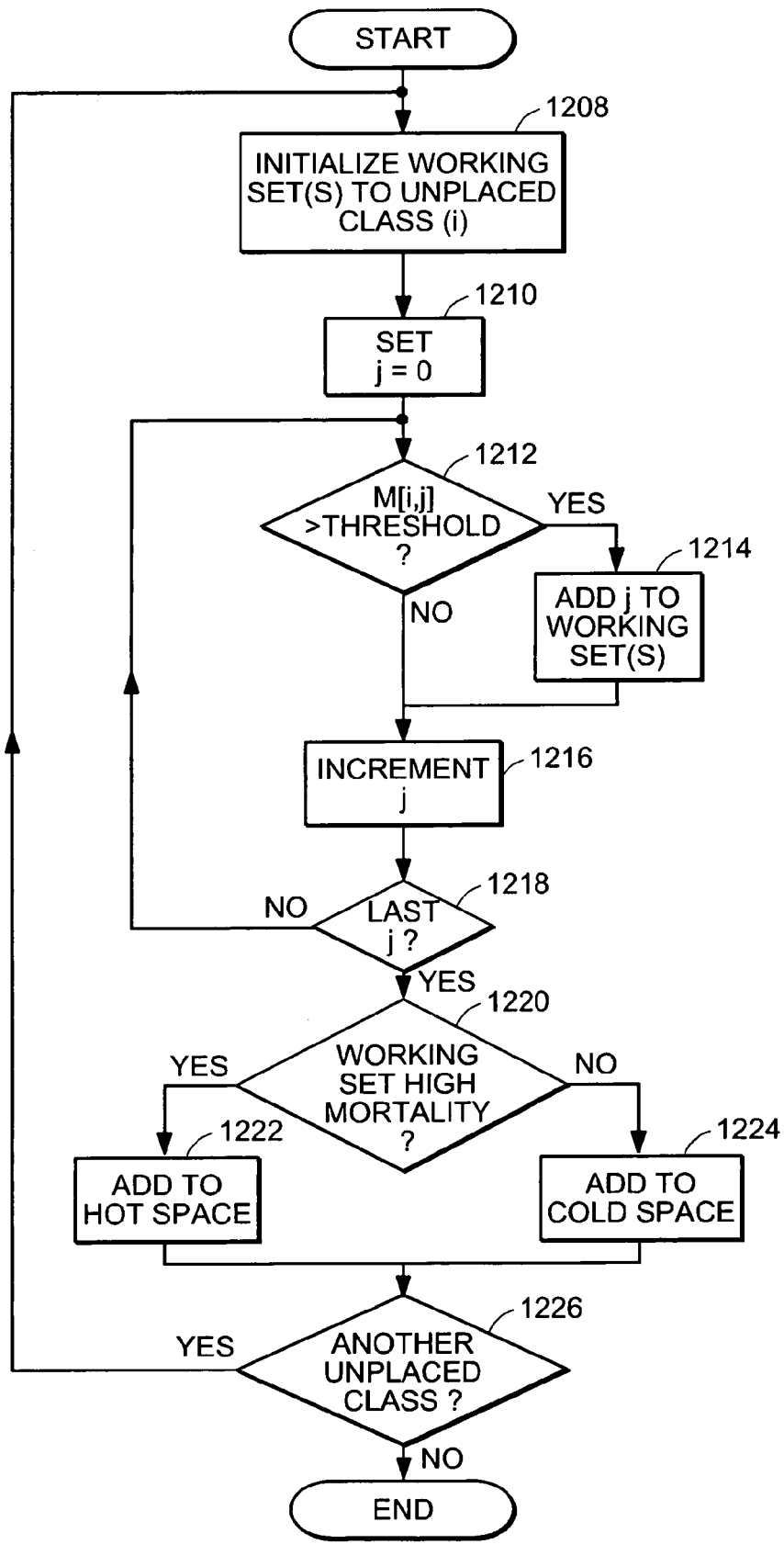
FIG. 12A is a flow chart illustrating a method for logically partitioning the heap so as to reduce the number of intergenerational pointers between hot space and cold space.

FIG. 12A is a flow chart illustrating a method for logically partitioning the heap 102 so as to reduce the number of intergenerational pointers between hot space 200 and cold space 202. By reducing the number of intergenerational pointers, fewer write barriers are needed. Thus the write barriers that are no longer needed may be eliminated as described later in conjunction with FIG. 12B.

Even if the write barrier is not eliminated, the number of write barriers scanned is reduced by reducing the number of intergenerational pointers. Thus, the garbage collector 100 is faster because of this reduction in intergenerational pointers.

A 2×2 matrix M is provided, where M[i,j] is the approximate number of pointers between objects of type i and j. The matrix is computed when the sample and partition routine requests a major collection (step 702 in FIG. 7). When the major collection routine 502 encounters a pointer between an object of type i and j during step 806 (FIG. 8), M[i,j] is incremented. The sample and partition routine 504 considers several classes or object types at a time.

At step 1208, the sample and partition routine 504 initializes the working set S to contain a single unplaced class or object type (i)(one not in hot space or cold space). Processing continues with step 1210.

At step 1210, the sample and partition routine 504 sets j=0. Processing continues with step 1212.

At step 1212, the sample and partition routine 504 checks if M[i,j] is above a pre-defined threshold for the class i in S. If so, processing continues with step 1214. If not processing continues with step 1216.

At step 1214, class j is added to S. Processing continues with step 1216.

At step 1216, j is incremented. Processing continues with step 1218.

At step 1218, if j is the last class in the matrix processing continues with step 1220. If not, processing continues with step 1212.

At step 1220, the net mortality rate of all the classes of the set S is considered. If this is high, processing continues with step 1222. If not, processing continues with step 1224.

At step 1222, the classes in the working set are added to hot space. Processing continues with step 1226.

At step 1224, the classes in the working set are added to cold space. Processing continues with step 1226.

At step 1226, the sample and partition routine 504 determines of there if there is another unplaced class. If so, processing continues with step 1208. If not, processing is complete.

This method avoids intergenerational pointers because classes whose instances are likely to point to one another are placed in the same space. In alternative embodiments, other data structures could be used for the matrix M, such as sparse graph representations. Also, step 1220 could be done in a variety of manners.

Figure 12B:
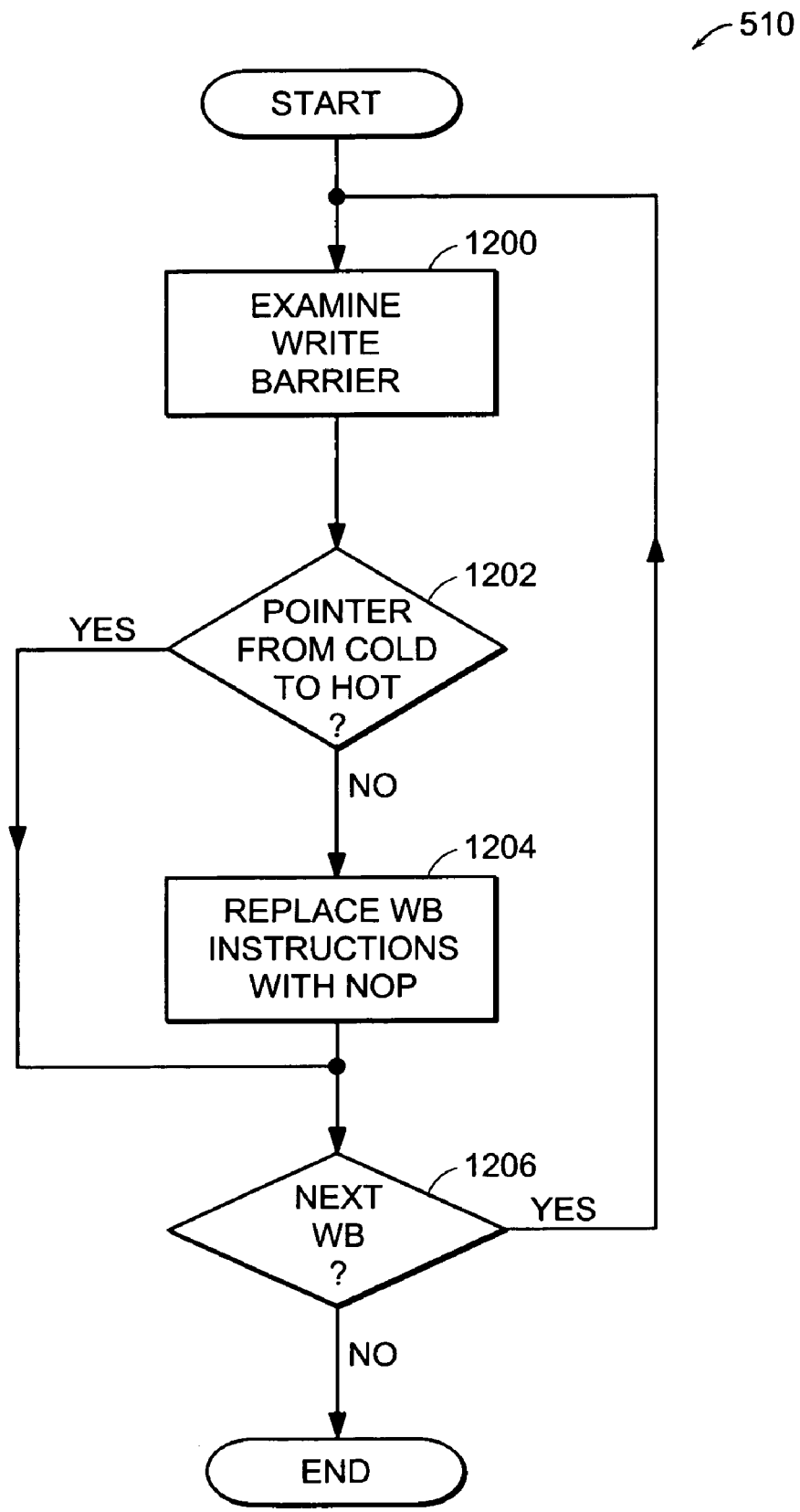
FIG. 12B is a flow chart illustrating a method for eliminating machine code instructions for a write barrier from machine code instructions generated by the just in time compiler for a Java™ application program.

FIG. 12B is a flow chart illustrating a method for eliminating write barriers from machine code instructions 1108 generated by the just in time compiler 1106 for a Java™ application program 1106. The flow chart is described in conjunction with FIG. 5, FIG. 11, FIG. 13A and FIG. 13B.

Figure 13A:
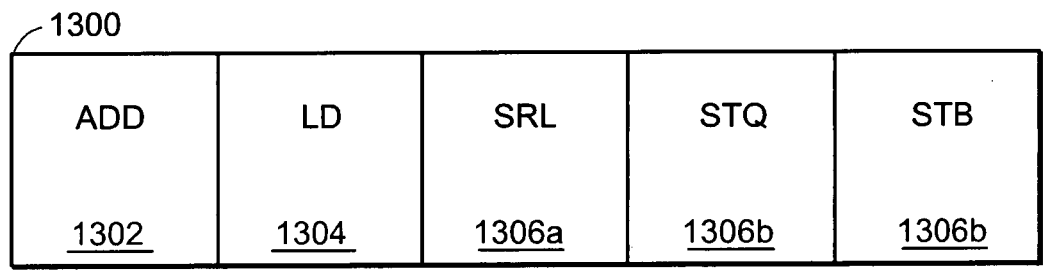
FIG. 13A illustrates a set of compiled machine instructions stored in memory in the computer system.
Figure 13B:
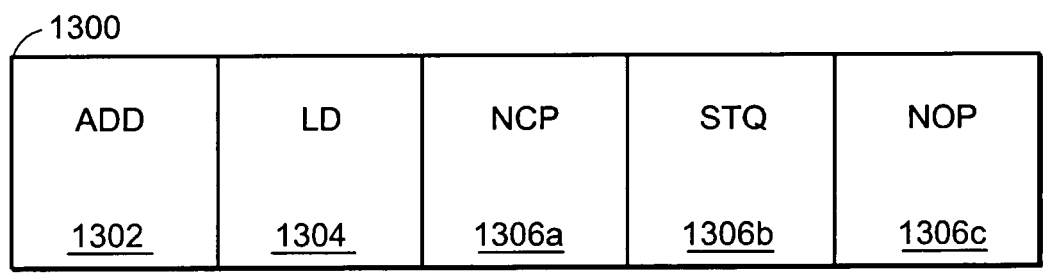
FIG. 13B illustrates the compiled machine instructions stored in memory after the memory barrier machine instructions have been removed by the memory barrier elimination routine shown in FIG. 5.

At step 1200, the write barrier elimination routine 510 (FIG. 5) examines the machine code instructions for a write barrier. A list of write barriers in the program are stored in a write barrier data structure (not shown). FIG. 13A illustrates a set of compiled machine instructions 1300 stored in memory in the computer system. The set of compiled machine instructions 1300 include an add instruction 1302, a load instruction 1304 and write barrier machine instructions 1306*a*, 1306*b* and 1306*c*. As shown in FIG. 13B, the write barrier machine instructions may include a shift instruction 1306*a* to compute the location in which to store the pointer, a store instruction 1306*b* to store the pointer in the computed location and a store instruction 1306*c* to mark that the pointer is stored. An example of write barrier machine instructions follows:

srl a0, GC_CARD_SHIFT, a2
stq a1, 0 (a2)
stb zero, 0 (a2)
where:
register a0 stores the location in which to store the pointer
register a1 is the pointer to store
register a2 is a scratch register
GC_CARD_SHIFT is an integer indicating the number of bits to shift The write barrier machine instructions 1306*a*, 1306*b* and 1306*c* are added by the just in time compiler 1106 upon detection of an intergenerational pointer.

Returning to FIG. 12B and continuing with step 1202.

At step 1202, the write barrier elimination routine 510 determines the object category 530 of the object 400 in which the pointer is stored and the object category 530 of the object 400 to which the pointer is pointing. The write barrier elimination routine 510 determines the object category 530 for an object class by searching the object hot/cold category list 506 after it has been generated by the sample and partition routine 504 as described in conjunction with FIG. 5. If the pointer stored in a cold object points to a hot object, the write barrier is needed and processing continues with step 1206. Otherwise, processing continues with step 1204.

At step 1204, the write barrier is for an intergenerational pointer from hot space 200 to cold space 202, cold space 202 to cold space 202 or hot space 200 to hot space 200 and thus can be removed. FIG. 13B illustrates the compiled machine instructions 1300 stored in memory after the memory barrier machine instructions have been removed by the memory barrier elimination routine 510 shown in FIGS. 5 and 12B. As shown the memory barrier instructions 1306*a* and 1306*c* are replaced by No Operation ("NOP") machine code instructions. Thus, the memory barrier instructions 1306*a* and 1306*b* that record the pointer store are removed. However, the pointer store instruction 1306*b* is not removed. Unlike the memory barrier machine code instructions, NOP machine instructions do not reference memory and thus will typically execute faster than the memory barrier instructions that they replace because the execution of NOPs will never result in a cache miss.

Returning to FIG. 12B and continuing with step 1204. After the memory barrier instructions have been replaced with NOP instructions as described in conjunction with FIG. 13, processing continues with step 1206.

At step 1206, the write barrier elimination routine 510 (FIG. 5) determines if all the machine code instructions 1108 have been examined. If so, processing is complete. If not, processing repeats beginning with step 1200.

Thus, the collector 100 is adaptive because the decision as to which space 200, 202 the object is to be placed in can be modified while the program 108 is executing. Furthermore, the same object type may be treated differently in different programs. For example, string may be cold in one program and hot in another program. Also, the collector 100 has better cache locality than a standard collector because same object category objects are stored together in the same area of the heap 102. For example, in an application which sorts arrays of strings, the improved locality of the strings results in significant increase in performance. Also, by collecting in a smaller partition, pause times are reduced. To further decrease the execution time of the program 108, a known cold object may be initially stored in the cold space 202 so that it never has to be copied from hot space 200 to cold space 202.

Figure 14:
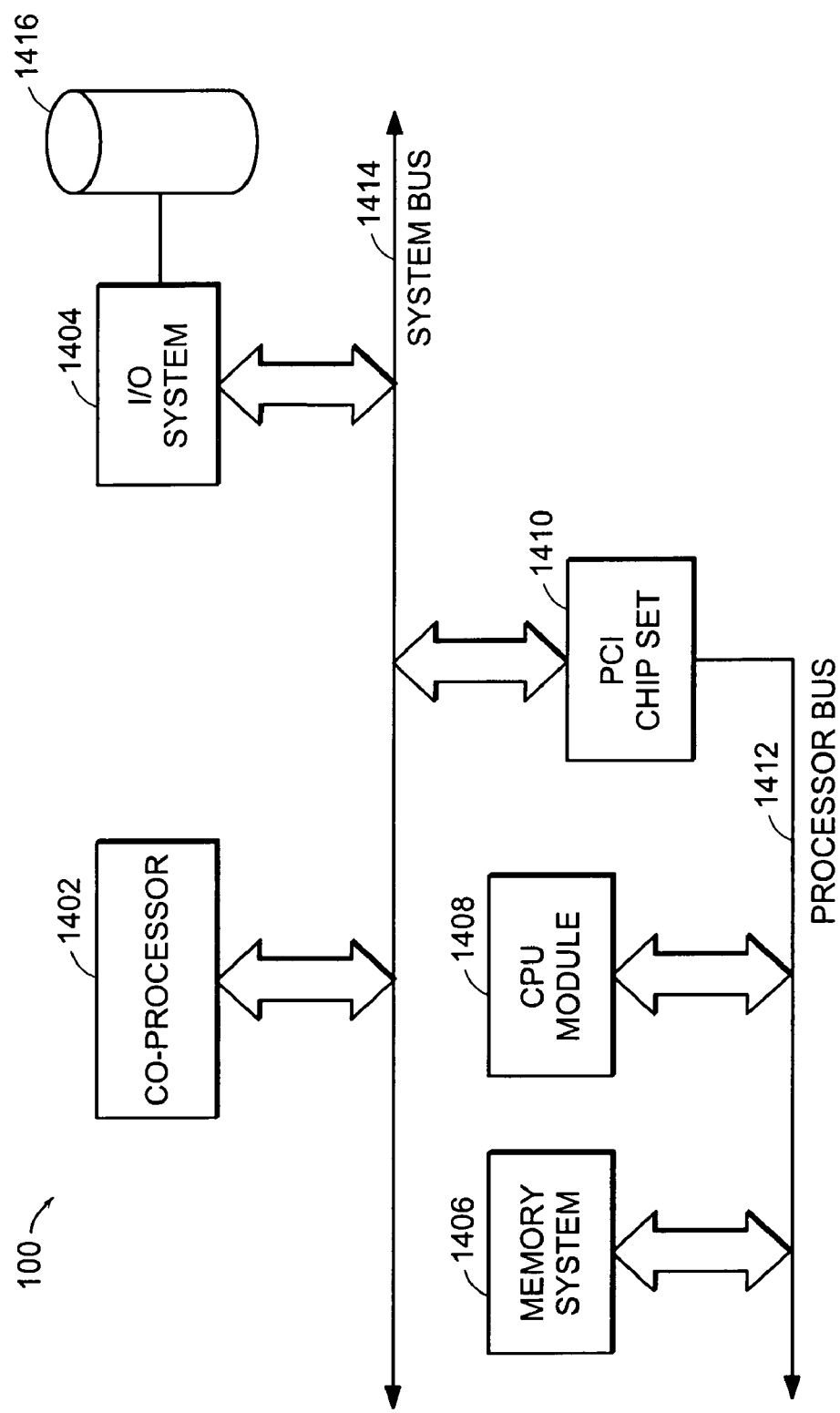
FIG. 14 is a block diagram of a computer system in which the present invention is used.

FIG. 14 is a block diagram of a computer system 1400 in which the present invention is used. Included in the computer system 1400 are at least one Central Processing Unit ("CPU") module 1408, a memory system 1406 and a system bus interface 1410 connected by a processor bus 1412. The CPU module 1408 includes a processor (not shown). The system bus interface 1410 is further connected to an Input/Output ("I/O") system 1404 by a system bus 1414. An external storage device 1416 is connected to the I/O system 1404. A collector 100 according to the principles of the present invention is stored in the storage device 1416 and also stored in the memory system 1406. The collector 100 manages memory for executing programs stored in the memory system 1406.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer-implemented method for collecting non-referenced objects stored in a computer-implemented heap by a program executing in a computer system comprising the steps of:
   storing an object of a particular type in one of a plurality of logical partitions in the heap dependent on a pre-defined category assigned to the object type, such that each object of a certain category is stored in one logical partition of the heap and objects of a category different from the certain category are stored in a logical partition different from the one logical partition;
   searching one of the logical partitions of the heap for referenced objects; and
   reclaiming non-referenced objects stored in the searched logical partition.

2. The method as claimed in claim 1 further comprising the step of:
   partitioning the heap into a cold logical partition and a hot logical partition by defining hot logical partition objects and cold logical partition objects.

3. The method as claimed in claim 2 wherein upon determining that the hot logical partition is full, the step of reclaiming further comprises the step of:
   moving referenced objects stored in the hot logical partition to the cold logical partition.

4. The method as claimed in claim 2 wherein the step of partitioning further comprises the step of:
   eliminating a write barrier for an intergenerational pointer between an object stored in the hot logical partition and an object stored in the cold logical partition.

5. The method as claimed in claim 4 wherein the step of eliminating a write barrier replaces write barrier machine code instructions with no operation machine code instructions.

6. The method as claimed in claim 2 wherein the step of partitioning further comprises the step of:
   identifying a hot object dependent on object type mortality.

7. The method as claimed in claim 6 wherein the step of identifying estimates the object type mortality dependent on difference of the number of bytes of the object type stored in the heap before a collection and the number of bytes of the object type stored in the heap after the collection.

8. The method as claimed in claim 2 wherein the step of partitioning partitions the heap to minimize intergenerational pointers between the hot logical partition and the cold logical partition.

9. A computer system comprising:
   a central processing unit connected to a memory bus by a system bus;
   an I/O system, connected to the system bus by a bus interface; and
   a computer-implemented collector for collecting non-referenced objects stored in a computer-implemented heap by a program executing in a computer system, the collector:
   storing an object of a particular type in one of a plurality of logical partitions in the heap dependent on a pre-defined category assigned to the type, such that each object of a certain category is stored in one logical partition of the heap and objects of a category different from the certain category are stored in a logical partition different from the one logical partition;
   searching one of the logical partitions for referenced objects; and
   reclaiming non-referenced objects stored in the searched logical partition.

10. A computer program product for collecting non-referenced objects stored in a computer-implemented heap by a program executing in a computer system, the computer program product comprising a computer usable medium having computer readable program code thereon, including a program code which:
    stores an object of a particular type in one of a plurality of logical partitions in the heap dependent on a pre-defined category assigned to the type, such that each object of a certain category is stored in one logical partition of the heap and objects of a category different from the certain category are stored in a logical partition different from the one logical partition;
    searches one of the logical partitions for referenced objects; and
    reclaims non-referenced objects stored in the searched logical partition.

11. A computer-implemented collector for collecting non-referenced objects stored in a computer-implemented heap by a program executing in a computer system comprising:
    an object allocation routine which stores an object of a particular type in one of a plurality of logical partitions in the heap dependent on a predefined category assigned to the object type, such that each object of a certain category is stored in one logical partition of the heap and objects of a category different from the certain category are stored in a logical partition different from the one logical partition; and a collection routine which searches one of the logical partitions of the heap for objects to which references are made and reclaims non-referenced objects stored in the searched logical partition of the heap.

12. The collector as claimed in claim 11 further comprising:

a sample and partition routine which defines a category of an object stored in the heap to be hot or cold.

13. The collector as claimed in claim 12 wherein upon determining that a hot logical partition is full, the collection routine searches a cold logical partition and the hot logical partition for referenced objects and moves referenced objects of the hot category stored in the hot logical partition to the cold logical partition.

14. The collector as claimed in claim 12 wherein the sample and partition further comprises:

a write barrier elimination routine, which eliminates a write barrier for an intergenerational pointer between an object stored in a hot logical partition and an object stored in a cold logical partition.

15. The collector as claimed in claim 14 wherein the write barrier elimination routine eliminates a write barrier by replacing a write barrier machine code instruction with a no operation machine code instruction.

16. The collector as claimed in claim 12 wherein the sample and partition routine defines the object category dependent on object type mortality.

17. The collector as claimed in claim 16 wherein the sample and partition routine estimates the object mortality dependent on difference of the number of bytes of the object type stored in the heap before a collection and the number of bytes of the object type stored in the heap after the collection.

18. The collector as claimed in claim 12 wherein the sample and partition routine partitions the heap to minimize intergenerational pointers between a hot logical partition and a cold logical partition.

19. A computer-implemented collector for collecting non-referenced objects stored in a computer-implemented heap by a program executing in a computer system comprising:

means for storing an object of a particular type in one of a plurality of logical partitions in the heap dependent on a predefined category assigned to the object type, such that each object of a certain category is stored in one logical partition of the heap and objects of a category different from the certain category are stored in a logical partition different from the one logical partition;

means for searching one of the logical partitions in the heap for referenced objects; and means for reclaiming non-referenced objects stored in the searched logical partition.

20. The collector as claimed in claim 19 further comprising:

means for partitioning the heap into a cold logical partition and a hot logical partition by defining a category of an object stored in the heap to be hot or cold.

21. The collector as claimed in claim 20 wherein upon determining that a hot logical partition is full, the means for searching searches a cold logical partition and the hot logical partition for referenced objects and moves referenced objects stored in the hot logical partition to the cold logical partition.

22. The collector as claimed in claim 20 wherein the means for partitioning further comprises:

means for eliminating a write barrier for an intergenerational pointer between an object stored in the hot logical partition and an object stored in the cold logical partition.

23. The collector as claimed in claim 22 wherein the means for eliminating a write barrier replaces write barrier machine code instructions with no operation machine code instructions.

24. The collector as claimed in claim 20 wherein the means for partitioning defines a hot object dependent on object type mortality.

25. The collector as claimed in claim 24 wherein the means for partitioning estimates the object mortality dependent on difference of the number of bytes of the object type stored in the heap before a collection and the number of bytes of the object type stored in the heap after the collection.

26. The collector as claimed in claim 20 wherein the means for partitioning partitions the heap to minimize intergenerational pointers between the hot logical partition and the cold logical partition.

* * * * *